US012288033B2

(12) United States Patent
Setayesh et al.

(10) Patent No.: US 12,288,033 B2
(45) Date of Patent: Apr. 29, 2025

(54) METHOD AND SYSTEM FOR SECURELY STORING PRIVATE DATA IN A SEMANTIC ANALYSIS SYSTEM

(71) Applicant: Oracle International Corporation, Redwood Shores, CA (US)

(72) Inventors: Mehrshad Setayesh, Lafayette, CO (US); Marta Lynn Studinger, Centennial, CO (US)

(73) Assignee: Oracle International Corporation, Redwood Shores, CA (US)

( * ) Notice: Subject to any disclaimer, the term of this patent is extended or adjusted under 35 U.S.C. 154(b) by 360 days.

(21) Appl. No.: 17/580,054

(22) Filed: Jan. 20, 2022

(65) Prior Publication Data

US 2022/0138431 A1 May 5, 2022

Related U.S. Application Data

(63) Continuation of application No. 14/815,737, filed on Jul. 31, 2015, now Pat. No. 11,263,401.

(Continued)

(51) Int. Cl.
*G06F 40/30* (2020.01)
*G06F 9/54* (2006.01)
(Continued)

(52) U.S. Cl.
CPC .............. *G06F 40/30* (2020.01); *G06F 9/542* (2013.01); *G06F 16/2379* (2019.01);
(Continued)

(58) Field of Classification Search
CPC .... G06F 40/30; G06F 16/353; G06F 16/2379; G06F 16/285; G06F 16/335;
(Continued)

(56) References Cited

U.S. PATENT DOCUMENTS 5,873,056 A 2/1999 Liddy et al.
5,946,386 A 8/1999 Rogers et al.
(Continued)

OTHER PUBLICATIONS

Yarowsky, David, and Radu Florian. "Evaluating sense disambiguation across diverse parameter spaces." Natural Language Engineering 8.4 (2002): Yarowsky, David, and Radu Florian. "Evaluating sense disambiguation across diverse parameter spaces." Natural Language Engineering 8.4 (2002) (Year: 2002).*

(Continued)

*Primary Examiner* — Mohsen Almani
(74) *Attorney, Agent, or Firm* — Invoke

(57) ABSTRACT

Disclosed is an approach for allowing an entity to perform semantic analysis in a SaaS semantic analysis platform upon private data possessed by one or more entities. In one or more embodiments, separate processing pipelines may be provided to the plurality of entities thereby keeping private data secure within the semantic analysis platform. In one or more embodiments, a common processing pipeline is provide with data associated a first entity being assigned a first identification code, and data associated with a second entity being assigned a second identification code.

20 Claims, 19 Drawing Sheets

Related U.S. Application Data

(60) Provisional application No. 62/031,771, filed on Jul. 31, 2014.

(51) Int. Cl.

| | | |
|---|---|---|
| *G06F 16/23* | (2019.01) | |
| *G06F 16/28* | (2019.01) | |
| *G06F 16/335* | (2019.01) | |
| *G06F 16/35* | (2019.01) | |
| *G06F 16/353* | (2025.01) | |
| *G06F 40/169* | (2020.01) | |
| *H04L 43/16* | (2022.01) | |
| *H04L 51/046* | (2022.01) | |
| *H04L 51/214* | (2022.01) | |
| *H04L 51/52* | (2022.01) | |

(52) U.S. Cl.
CPC .......... *G06F 16/285* (2019.01); *G06F 16/335* (2019.01); *G06F 16/353* (2019.01); *G06F 40/169* (2020.01); *H04L 43/16* (2013.01); *H04L 51/046* (2013.01); *H04L 51/214* (2022.05); *H04L 51/52* (2022.05)

(58) Field of Classification Search
CPC ....... G06F 40/169; G06F 9/542; H04L 51/52; H04L 51/214; H04L 43/16; H04L 51/046
See application file for complete search history.

(56) References Cited

U.S. PATENT DOCUMENTS

| | | | |
|---|---|---|---|
| 6,349,307 | B1 | 2/2002 | Chen |
| 6,523,026 | B1* | 2/2003 | Gillis .................... G06F 16/332 |
| 7,289,949 | B2 | 10/2007 | Warner et al. |
| 7,383,172 | B1 | 6/2008 | Jamieson |
| 8,090,724 | B1 | 1/2012 | Welch et al. |
| 8,245,135 | B2 | 8/2012 | Cai et al. |
| 8,762,302 | B1 | 6/2014 | Spivack et al. |
| 8,812,752 | B1 | 8/2014 | Shih et al. |
| 8,954,440 | B1 | 2/2015 | Gattani et al. |
| 8,990,200 | B1 | 3/2015 | Christensen et al. |
| 9,026,529 | B1 | 5/2015 | Osofsky et al. |
| 9,336,192 | B1 | 5/2016 | Barba et al. |
| 9,727,925 | B2 | 8/2017 | Subramanian et al. |
| 10,002,330 | B2 | 6/2018 | Kulkarni et al. |
| 2002/0107843 | A1 | 8/2002 | Biebesheimer et al. |
| 2002/0116174 | A1 | 8/2002 | Lee et al. |
| 2003/0061200 | A1 | 3/2003 | Hubert et al. |
| 2003/0154072 | A1 | 8/2003 | Young et al. |
| 2004/0162827 | A1 | 8/2004 | Nakano |
| 2004/0205448 | A1 | 10/2004 | Grefenstette et al. |
| 2004/0225667 | A1 | 11/2004 | Hu et al. |
| 2005/0091203 | A1 | 4/2005 | Liu et al. |
| 2005/0108001 | A1 | 5/2005 | Aarskog |
| 2006/0069589 | A1 | 3/2006 | Nigam et al. |
| 2006/0153345 | A1 | 7/2006 | Bushey et al. |
| 2007/0067157 | A1 | 3/2007 | Kaku et al. |
| 2008/0133488 | A1 | 6/2008 | Bandaru et al. |
| 2009/0112892 | A1 | 4/2009 | Cardie et al. |
| 2009/0177484 | A1 | 7/2009 | Davis et al. |
| 2009/0271324 | A1 | 10/2009 | Jandhyala et al. |
| 2009/0285384 | A1 | 11/2009 | Pollock et al. |
| 2010/0119053 | A1 | 5/2010 | Goeldi |
| 2010/0125540 | A1 | 5/2010 | Stefik et al. |
| 2010/0280985 | A1 | 11/2010 | Duchon et al. |
| 2010/0312769 | A1 | 12/2010 | Bailey et al. |
| 2011/0137906 | A1* | 6/2011 | Cai ......................... G06F 40/30 707/750 |
| 2011/0153595 | A1 | 6/2011 | Bernstein et al. |
| 2011/0196670 | A1 | 8/2011 | Dang et al. |
| 2011/0202334 | A1 | 8/2011 | Abir |
| 2011/0282651 | A1 | 11/2011 | Nygaard et al. |
| 2012/0011432 | A1 | 1/2012 | Strutton |
| 2012/0089621 | A1 | 4/2012 | Liu et al. |
| 2012/0124149 | A1 | 5/2012 | Gross et al. |
| 2012/0131139 | A1 | 5/2012 | Siripurapu et al. |
| 2012/0185236 | A1* | 7/2012 | Blodgett ................. G06F 40/58 704/2 |
| 2012/0278388 | A1 | 11/2012 | Kleinbart et al. |
| 2012/0303559 | A1 | 11/2012 | Dolan |
| 2013/0081056 | A1 | 3/2013 | Hu et al. |
| 2013/0124193 | A1* | 5/2013 | Holmberg ............. G06F 40/237 704/E15.001 |
| 2013/0136253 | A1 | 5/2013 | Liberman et al. |
| 2013/0238785 | A1 | 9/2013 | Hawk et al. |
| 2013/0262442 | A1 | 10/2013 | Dennis |
| 2013/0268534 | A1 | 10/2013 | Mathew et al. |
| 2013/0336310 | A1 | 12/2013 | Laasik et al. |
| 2013/0339457 | A1 | 12/2013 | Freire et al. |
| 2014/0039877 | A1 | 2/2014 | Guenigault et al. |
| 2014/0074551 | A1 | 3/2014 | Setayesh et al. |
| 2014/0074843 | A1 | 3/2014 | White et al. |
| 2014/0156341 | A1 | 6/2014 | Kruk |
| 2014/0164530 | A1 | 6/2014 | Stoertenbecker |
| 2014/0180788 | A1 | 6/2014 | George et al. |
| 2014/0188457 | A1 | 7/2014 | Fink et al. |
| 2014/0189114 | A1 | 7/2014 | Richardson |
| 2014/0215443 | A1 | 7/2014 | Voccio et al. |
| 2014/0344327 | A1 | 11/2014 | Lovric et al. |
| 2014/0344718 | A1 | 11/2014 | Rapaport et al. |
| 2014/0372513 | A1 | 12/2014 | Jones |
| 2015/0089409 | A1 | 3/2015 | Asseily et al. |
| 2015/0100377 | A1 | 4/2015 | Penumaka et al. |
| 2015/0120302 | A1 | 4/2015 | McCandless et al. |
| 2015/0149448 | A1 | 5/2015 | McCandless et al. |
| 2015/0149463 | A1 | 5/2015 | McCandless et al. |
| 2015/0170152 | A1 | 6/2015 | Shaffer et al. |
| 2015/0195406 | A1 | 7/2015 | Dwyer et al. |
| 2015/0220647 | A1 | 8/2015 | Gangwani |
| 2016/0034445 | A1 | 2/2016 | Setayesh et al. |
| 2016/0034560 | A1 | 2/2016 | Setayesh et al. |
| 2016/0034571 | A1 | 2/2016 | Setayesh et al. |
| 2016/0092551 | A1 | 3/2016 | Tang et al. |

OTHER PUBLICATIONS

De Luca, Ernesto W., et al. "Using multilingual ontologies for adaptive web-based language exploration." Proceedings of the International Workshop on Applications of Semantic Web Technologies for E-Learning (SW-EL06). (Year: 2006).*

Ilgen, Bahar, Eşref Adal, and A. Cüneyd Tantu. "A comparative study to determine the effective window size of Turkish word sense disambiguation systems." Information Sciences and Systems 2013: Proceedings of the 28th International Symposium on Computer and Information Sciences. (Year: 2013).*

Paredes et al., "Virtualized Connectivity in a Cloud Services Environment", CA 2819545 A1 Jun. 7, 2012 (Year: 2012).*

Adult Survivors of Childhood Trauma and Recovered Memories, http://www.istss.org/public-resources/remembering-childhood-trauma.aspx, Mar. 5, 2018.

Liyang, Tang, et al. "A conceptual framework for business intelligence as a service (saas bi)." Intelligent Computation Technology and Automation (ICICTA), 2011 International Conference on. vol. 2. IEEE, 2011.

Memory Recall/Retrieval—Memory processes—The Human memory, http://www.lukemastin.com/humanmemory/processes_recall.html, Mar. 6, 2018.

Tonellotto, Nicola, Craig Macdonald, and Iadh Ounis. "Efficient and effective retrieval using selective pruning." Proceedings of the sixth ACM international conference on Web search and data mining. 2013. (Year: 2013).

* cited by examiner

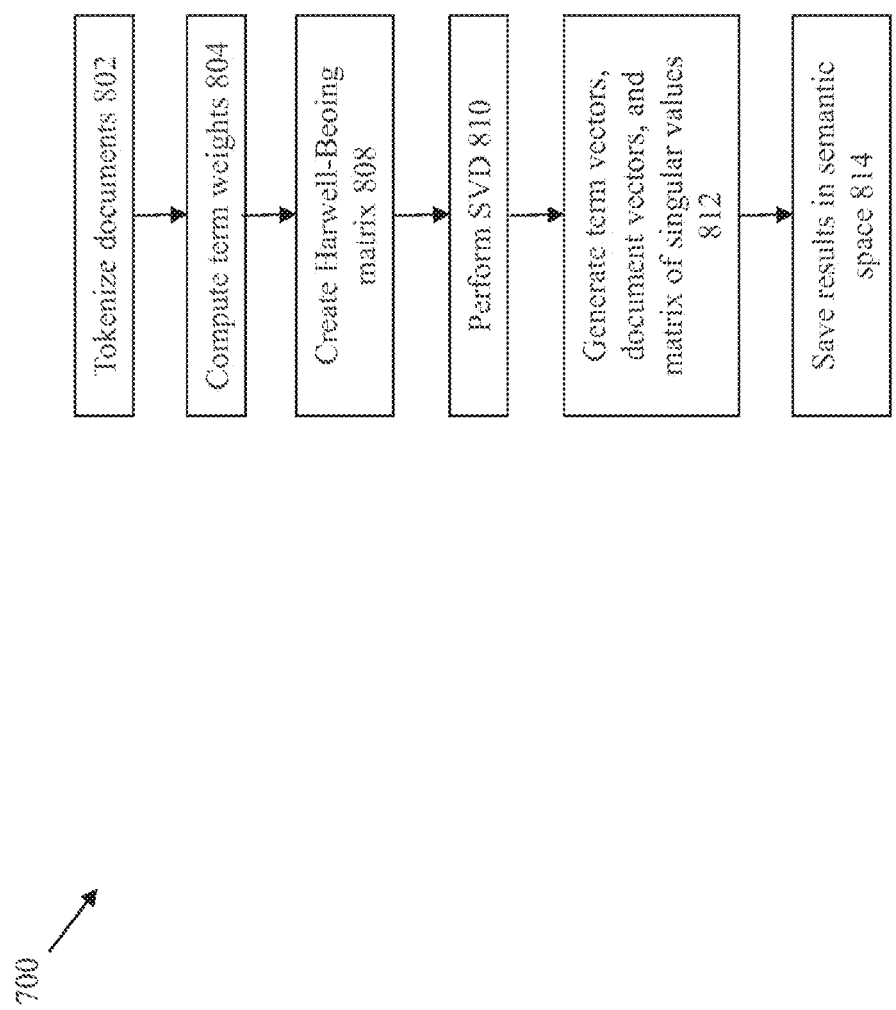

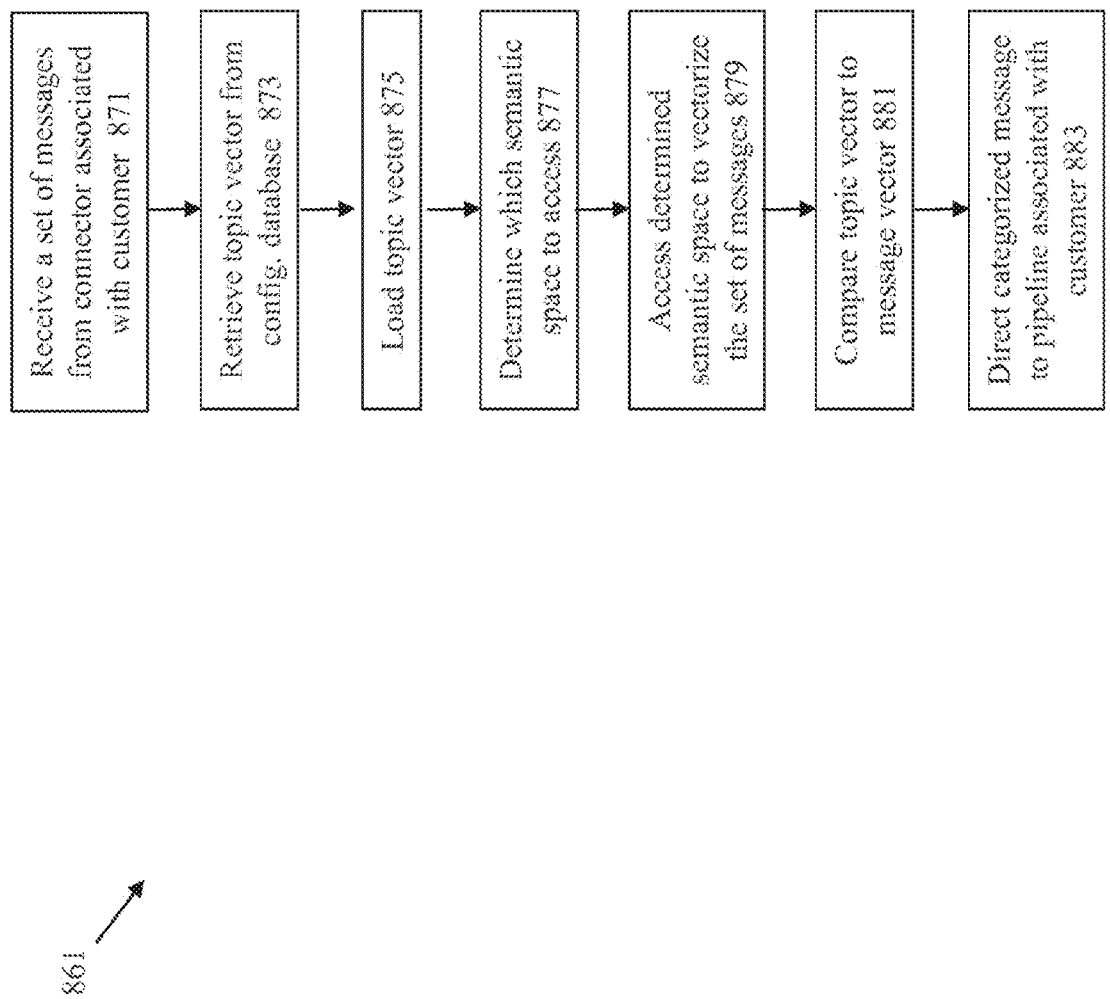

```
GET /analytics_job/1   HTTP/1.1
Host: api.collectiveintellect.com
Accept: application/json
HTTP/1.1 200 OK
Date: Wed, 24 Jul 2013 16:09:39 GMT
Content-Type: application/json
{
  "status": "completed",
  "customerId": "...",
  "documents": [
    {
      "id": "...",
      "theme": {
        "name": "Consumer Electronics"
      },
      "sentiment": {
        "name": "Positive",
        "value": 1
      },
      "languageTag": {
        "code": "zh-CN",
        "region": "China",
        "language": "Chinese"
      },
      "topics": [
        {
          "id": "TOPICID",
          "name": "iPod"
        }
      ],
      "indicators": [
        {
          "id": "DIMENSIONID",
          "name": "Favorable"
        }
      ]
    }
  ],
  "canonicalLink": "/analytics_job/1"
}
```

METHOD AND SYSTEM FOR SECURELY STORING PRIVATE DATA IN A SEMANTIC ANALYSIS SYSTEM

INCORPORATION BY REFERENCE; DISCLAIMER

The following applications are hereby incorporated by reference: application Ser. No. 14/815,737 filed on Jul. 31, 2015; application No. 62/031,771 filed on Jul. 31, 2014; application Ser. No. 14/815,692 filed on Jul. 31, 2015; application Ser. No. 14/815,714 filed on Jul. 31, 2015. The Applicant hereby rescinds any disclaimer of claim scope in the parent application(s) or the prosecution history thereof and advises the USPTO that the claims in this application may be broader than any claim in the parent application(s).

BACKGROUND

A typical organization (e.g., enterprise, business, non-profit, etc.) or any entity accumulates a large amount of data in the form of various messages and/or communications that are circulated within the organization (e.g., emails, message boards, etc.) and outside the organization (e.g., discussion of products, policies, services, requests to the organization, etc.) Some of the communications may be from customers and other third parties during the course of a typical business day. The communications may pertain to a wide range of different topics directed to sales inquiries, customer complaints, product feedback, etc.

While most organizations handle these communications by attempting to understand the content of the communication, this process is especially difficult, especially in the context of large organizations. Given the overwhelming quantity of such messages received by a typical large business, it is evident that a manual approach to process these messages can be quite tedious, inefficient, and does not scale very well for large organizations.

One approach to handle such communications is to perform semantic analysis in order to understand a semantic significance of the communication, and accordingly handle the communication. Such an automated approach may make it easier for organizations to analyze a large amount of messages (e.g., several thousand a day), and take the appropriate action based. Rather than each organization implementing a semantic analysis system, in some embodiments, semantic analysis may be performed as a service, through a software-a-service (SaaS) platform. However, in a SaaS semantic analysis system, it may be especially important to keep data associated with one entity separate from other data sources in order to ensure confidentiality and privacy.

This may be difficult to achieve at least in part due to various constraints on system architecture in traditional systems. Such privacy concerns may prevent many organizations or entities to utilize semantic analysis systems. Therefore, there is a need for an improved approach to analyze and process communications possessed by an enterprise, business, or organization, and to ensure that such data and analysis is kept secure and private.

Other additional objects, features, and advantages of the invention(s) are described in the detailed description, figures, and claims.

SUMMARY

One or more embodiments of the current application address the above problems by performing semantic analysis on a set of data associated with an entity. In one aspect, a system comprises a plurality of processing pipelines to perform semantic analysis for a plurality of entities in a software-as-a-service (SaaS) platform, wherein separate processing pipelines are assigned to the plurality of entities in the SaaS platform such that a first entity corresponds to a first processing pipeline and a second entity corresponds to a second processing pipeline, and wherein a processing pipeline of the plurality of processing pipelines comprises a connector to a data source associated with a respective entity that receives data for the respective entity, and a semantic analysis mechanism to perform semantic analysis on the received set of data, the semantic analysis performed by accessing one or more semantic databases to vectorize the received set of data, and analyzing the vectorized set of data against one or more topic vectors, and to direct the semantically analyzed data to a storage mechanism associated with the respective entity.

In another aspect, a system comprises a common processing pipeline to perform semantic analysis for a plurality of entities in a software-as-a-service (SaaS) platform, wherein the common processing pipeline processes data corresponding to a first entity of the plurality of entities and data corresponding to a second entity of the plurality of entities, the data corresponding to the first entity assigned a first identification code and the data corresponding to the second entity assigned a second identification code, and wherein the common processing pipeline comprises a configuration database to store a respective identification code assigned to data corresponding to the respective entity, and a semantic analysis mechanism to perform semantic analysis on the data corresponding to the respective entity, the semantic analysis mechanism comprising analyzing the data corresponding to the respective entity against retrieved topic vectors associated to the respective entity based at least in part on the respective identification code, and directing the analyzed data to a storage mechanism associated with the respective entity based at least in part on the respective identification code.

Further details of aspects, objects, and advantages of embodiments are described below in the detailed description, drawings, and claims. Both the foregoing general description and the following detailed description are examples only and explanatory, and are not intended to be limiting as to the scope of the disclosure.

BRIEF DESCRIPTION OF THE FIGURES

FIG. 7 shows a flowchart of an approach to create a semantic space according to some embodiments of the invention(s).

FIGS. 8A-8D illustrate various embodiments of system architectures that may be implemented to maintain private data from a plurality of customers, according to some embodiments of the invention(s).

FIG. 11B an illustration of an example GET call.

DETAILED DESCRIPTION

Figure 1:
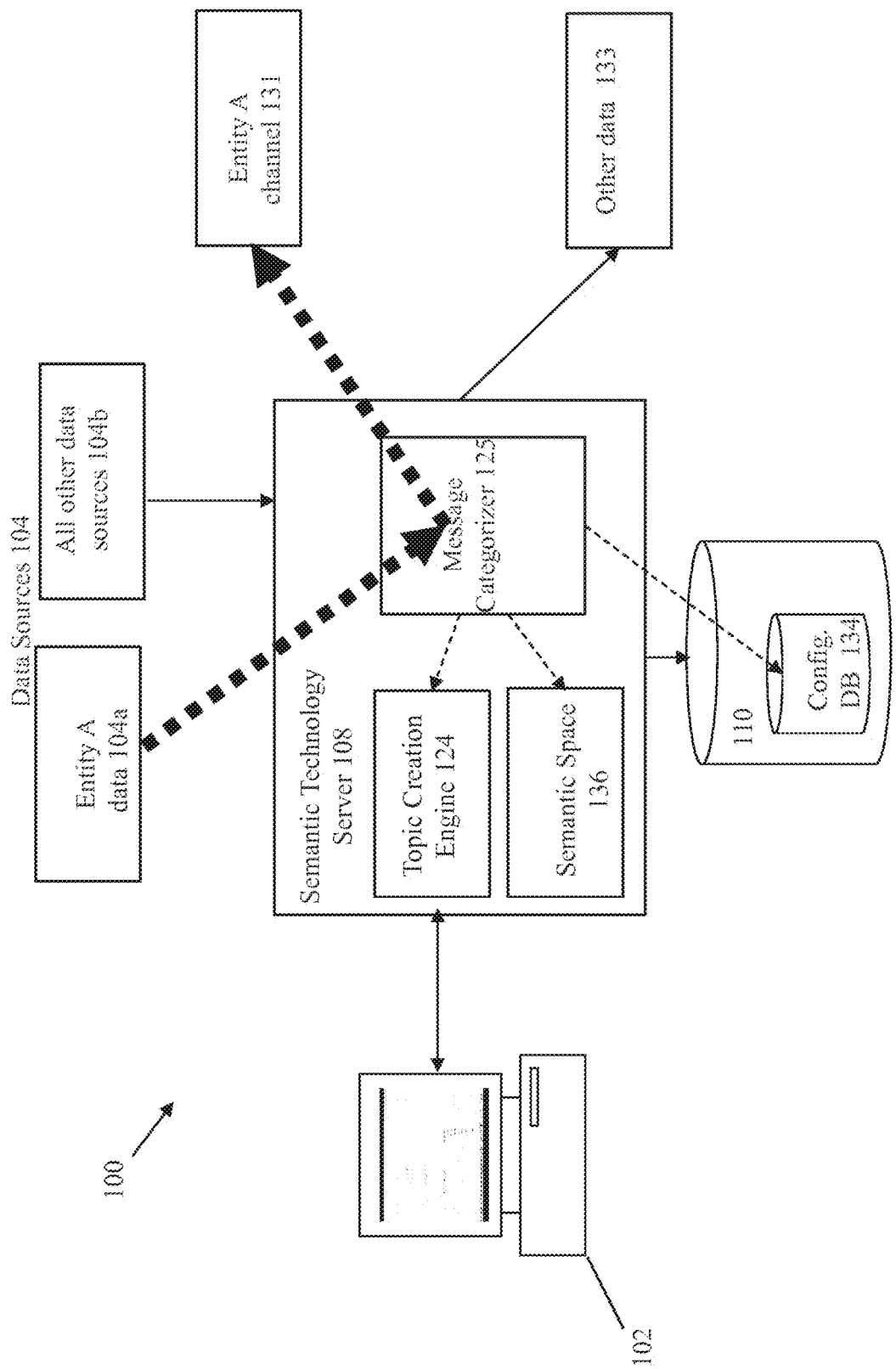
FIG. 1 illustrates an example system which may be employed in some embodiments of the invention(s).

Embodiments of the present invention(s) provide a system, method, and computer program product for providing a SaaS platform for semantic analysis, and providing mechanisms in the SaaS platform that ensure that private data of one or more entities remains private through the various semantic analysis processing functions of the semantic analysis platform. Some mechanisms may relate to a hardware infrastructure of the SaaS semantic analysis platform that provides separate processing pipelines to each of the customers of the semantic analysis platform. In other embodiments, a vigorous identification scheme may be employed such that identification codes are assigned to data associated with the different entities, and tracked throughout the semantic analysis platform, until it is directed to a dedicated storage mechanism for the entity.

The present disclosure therefore provides great benefit to multiple organizations by providing semantic analysis as a service such that multiple entities may access and provide data to the system, to receive semantically analyzed data that may be used in any manner of interest to the organization or entity. In one or more embodiments, the entity (e.g., enterprise, small business, non-profit, individual, etc.) may employ the semantic analysis platform on some type of subscription, or pay-per-use basis. The semantic analysis platform allows organizations to monitor the content of the communications and to identify a range of topics pertaining to the content of the communications, as will be discussed in further detail below.

By knowing about and understanding these topics, the entity can then act upon that information to identify actionable messages. For example, potential customers and possible sales leads may be identified or problematic situations that may require immediate involvement of customer service personnel may be identified based on the messages.

For example, consider a CRM (Customer Relationship Management) application, which is designed to facilitate the ability of a business to create, develop, and build relationships with its customers or potential customers. It would be very desirable to allow the business CRM application to stay informed of actionable message content, to identify potential customers, possible sales leads, and handle possible customer complaints and problems.

The present invention(s) provides a mechanism for allowing data to be accessed by a semantic analysis system, regardless if the data pertains to data that is private to an enterprise or public data. In one or more embodiments, separate processing pipelines may be provided for each of the customers of the semantic analysis platform, thereby ensuring that data is kept private. In other embodiments, identification codes that are unique to the customer may be used, thereby ensuring that only data having the required identification code is channel to an endpoint or storage mechanism associated with the customer entity.

Additionally, or alternatively, data may be transmitted to the semantic analysis system through a semantic API, and the semantically analyzed data (e.g., enriched data) may simply be pushed back to the requesting organization. Topics can be created, which provides an approach to capture the scope of a given set of subject matter. The topic definitions can then be used, for example, to automatically classify data, e.g., by determining whether a given message/post falls within the topic definition. Based at least in part upon perforating semantic analysis, themes may be identified within the data.

The semantic analysis system may refer to a system that performs semantic analysis on a set of data associated with one or more entities or organizations. Semantic analysis is especially helpful in determining an underlying meaning and/or a context of terms used in language. Semantic analysis may refer to determining a semantic significance of words in the received set of data relative to the many other possible semantic dimensions of the words. Semantic significance may refer to a known meaning or context of a term. A term may have many meanings or semantic significances. Semantic analysis allows data to be parsed in a manner that is cognizant of one intended semantic significance of one or more terms while disregarding data that is unrelated to the intended semantic significance. Thus, the goal of semantic analysis is that the analyzed data will then be more relevant to the user, because the data corresponds to an underlying context or meaning desired by the user, while disregarding data that is unrelated to the meaning desired by the user even if it contains the same terms.

For example, a word may have many meanings or semantic significances associated with it. The same word may have various connotations, sometimes ones that arc diametrically opposite to each other. These various meanings or dimensions may be represented mathematically by vectors, as will be described in further detail below. Consider a simple word, "bark." In one context, the word "bark" may be the verb that refers to a sound produced by dogs. In another context, the word "bark" may refer to a curt or angry response by a person. In yet another context, the word "bark" may refer to the outside covering of a tree. Thus, a single word may have multiple semantic significances. The goal of the semantic analysis system is to determine the semantic significance that most closely aligns with the semantic significance that is of interest to an entity.

Themes may be identified, for example, by performing semantic analysis and identifying semantic clusters within the analyzed data. The semantic clusters correspond to one or more themes within the data. For example, latent semantic analysis (LSA), an advanced form of statistical language modeling, can be used to perform semantic analysis upon the content. This permits the system to understand the contextual and semantic significance of terms that appear within the data. For example, semantic analysis can be used to understand the difference between the term "Galaxy" used in the astronomy context, and "Galaxy" that is used to refer to the name of a professional soccer team.

To this end, and as will be described in greater detail below, the many semantic significances of one or more terms are represented as mathematical vectors. In the above example, the word bark, as in bark of a dog may be assigned a first semantic significance through a first mathematical vector (e.g., having a magnitude and direction), and the word bark, as in tree bark may be assigned another semantic significance through a second mathematical vector (e.g., having another magnitude and direction). In this way, mathematical vectors are assigned to a large bank of terms in a particular language (and the similar process is repeated for other languages), and stored for reference in order to determine the semantic significance of terms in received data.

In order to understand the semantic significance of words of interest to a particular entity, topics are created, in which a user associated with the entity defines the semantic significance of one or more terms of interest. In doing so, the user is essentially selecting one or more mathematical vectors over other mathematical vectors associated with a term (e.g., choosing "bark" as in tree bark, over "dog bark"). Topics can be created, which provides an approach to capture the scope of a given set of subject matter. The topic definitions can then be used, for example, to automatically classify data, e.g., by determining whether a given message/post falls within the topic definition. Based at least in part upon performing semantic analysis, themes may be identified within the data.

In order to perform semantic analysis on the data received from the entity, the mathematical vectors of terms in the received data are compared to mathematical vectors associated with created topics, in order to semantically categorize the data based on topics or terms that are of specific interest to the user. The following disclosure will go through various embodiments of how semantic analysis is performed and routed to desired endpoints.

FIG. 1 illustrates an example system 100 which may be employed in some embodiments of the invention(s). The system includes one or more users at one or more user stations 102 that operate the system. The user station 102 comprises any type of computing station that may be used to operate or interface with the applications in the system. The user station 102 may be associated with a customer of the semantic analysis system, in one or more embodiments. In other embodiments, the user station 102 may be associated with a system administrator of the semantic analysis system.

Examples of such user stations 102 may include, for example, workstations, personal computers, or remote computing terminals. The user station 102 comprises a display device, such as a display monitor, for displaying a user interface to users at the user station. The user station 102 also comprises one or snore input devices for the user to provide operational control over the activities of the system 100, such as a mouse or keyboard to manipulate a pointing object in a graphical user interface to generate user inputs.

A semantic technology server 108 receives data from one or more data sources 104. Such data sources 104 include, for example, data from a customer, or enterprise private data, such as from entity A (e.g., 104a). This data refers to data that originates or is associated with a particular customer entity. In one or more embodiments, an entity may refer to a business. The business may be an enterprise or business organization that is engaged in an activity (e.g., selling of goods or services, etc.) for profit. The enterprise may be a large business organization (e.g., having more than 1000 employees, etc.) The enterprise may refer to any undertaking by an individual or group of individuals for profit. In one or more embodiments, the enterprise may be a business unit or firm (e.g., law fin The enterprise may be a corporation, in one or more embodiments. In one or more embodiments, the entity may refer to a small business (e.g., having less than 1000 employees). The enterprise may deal with goods or services in any area (e.g., software, pharmaceuticals, engineering, manufacturing, etc.)

In other embodiments, the entity may refer to a non-profit organization. The non-profit organization may be an organization that uses surplus revenues to achieve a purpose or mission rather than using the revenues for profit. The entity may refer to any type of non-profit organization having any number of employees. In other embodiments, entity may refer to a government agency. The government agency may be a local governmental agency, a state government agency, a federal agency or even some international government agency. The government agency may provide may be a permanent or semi-permanent organization in a government that is responsible for oversight and administration of specific functions. The government agency may have any number of employees.

The entity may refer generally to any organization comprise a plurality of people, such as an institution that has a collective goal. In one or more embodiments, the entity may be an individual (e.g., a solo business owner, etc.). In one or more embodiments, an entity is a customer or tenant of a system that serves one or more tenants or one or more customers and offers services to employees or user accounts for the customer or tenant.

For example, enterprise private data 104a associated with entity A may be email communications that are private to the entity. Data 104a may also refer to any type of data provided by the entity itself. For example, an enterprise call center may produce many messages private to an organization that needs to be processed.

Enterprise data 104a may also refer to data that is requested by the entity. For example, the customer entity may request analysis of a set of social media data (e.g., Twitter® feed). This data, although not originating directly from a source that is associated with the entity, may still be considered data corresponding to entity A, and the data may be kept private and tracked within the semantic analysis platform. Data source 104a may also refer to enterprise community data such as for example, data from Jive® or Lithium®.

As shown in FIG. 1, data from other data sources 104b is also fed into the semantic technology server 108. Data from other data sources 104b may refer to data associated with other customer entities. Data from other data sources 104b may also refer to public data sources, social media data sources, and/or any other data that is not explicitly identified to be associated with entity A.

Data from other data sources 104b may also refer to enterprise community data, such as for example, data from Jive® or Lithium®. The other data sources 104b may also include social media sources 104a such as a social network, blog or web feed (e.g., Facebook®, Twitter®, Blogger®, and RSS). The content may include one or more comments (e.g., a Facebook® comment, comment to a blog post, reply to a previous comment, etc.) or uploaded postings (e.g., images and associated metadata, text, rich media, URLs, etc.) at one or more sources. The social data/content may therefore comprise a variety of forms and/or types. It is noted that while the currently described embodiment describes analysis of these specific types of data, the inventive concepts are applicable to analysis of other types of content as well.

As shown in FIG. 1, data from entity A 104a goes through the semantic technology server 108, and is semantically analyzed such that it is input into a destination channel associated with entity A (e.g., 131). Various infrastructure and/or software mechanisms may be provided to the semantic analysis platform that ensure that data is kept private, as will be discussed in further detail below. Semantically analyzed data from other data sources 104b are channeled out to other data channels 133.

Semantic analysis is performed upon the data received from various data sources by the semantic technology server 108. The semantic technology server 108 may be implemented as a stand-alone semantic analysis tool, or can be included as a component within another tool, e.g., a social relationship management tool. The semantic technology server 108 may also be implemented as a SaaS platform, as discussed above.

A SaaS platform typically refers to a software service delivery model in which software is centrally hosted, and is typically accessed by one or customers through a subscription or some other payment model. In one or more embodiments, SaaS may be considered a software distribution model in which various software applications are hosted by a vendor (e.g., SaaS provider), and are made available to clients over a network.

This is in contrast to older models in which software products were bought and downloaded at the client site. Rather, in SaaS models, software is accessed and delivered through a centrally hosted platform such that customers are not burdened with maintenance and support costs, and yet have varying degrees of access (e.g., based on a selected payment scheme) to the software. SaaS is typically accessed by users through a thin-client via a web browser. In some embodiments, customers of the SaaS platform have dedicated resources (e.g., server, database resources, etc.). In other embodiments, customers may simply provide data to be analyzed, and receive the data in raw form (e.g., without data being locally stored at the SaaS platform. As will be described further below, in some embodiments, each customer may be provided a separate processing pipeline. In other embodiments, a common pipeline is used for all the customers.

In one or more embodiments SaaS providers may price software applications through a subscription model (e.g., monthly fee, annual fee, pay-per use, etc.). Based on the type of payment model that is selected, a set of cloud infrastructure components may be provided to the customer entity. In one or more embodiments, customers may be billed based on an amount of data stored in the SaaS platform. Thus, a bigger client, storing more data on the cloud may be charged at a higher rate as compared to a smaller client storing less data. In another embodiment, a client having dedicated platform resources (e.g., dedicated servers, databases, etc.) may be charged a higher rate as compared to clients that simply receive data from directly from the SaaS platform. In yet another embodiment, clients may be billed based on an amount of processing power utilized by the SaaS platform. Thus, a client requiring greater analysis of data may be charged more as compared to clients that require minimal analysis. In other embodiments, the SaaS platform may charge based on a number of users that are allowed to access the platform. In another embodiment, the SaaS platform may base pricing based on a size of the entity itself (e.g., entities having more than 1000 employees may be charged more, etc.). Similarly, many other payment schemes can be envisioned.

In some embodiments, the semantic technology server 108 comprises a topic creation engine 124 to create topics with respect to the data (e.g., social media data, enterprise data, etc.) received from the various data sources. The topic creation engine 124 processes the data using semantic analysis to identify themes within the data. The identified themes are used to create definition parameters for a new topic, e.g., by adding semantic filters that pertain to the identified themes. In operation, the topic creation engine 124 may access a semantic space 136 to perform the themes analysis. The topic definitions created using the topic creation engine 124 may be stored in a configuration database 134.

The semantic technology server 108 also comprises a message categorizer 125. The message categorizer performs message categorization to analyze the content of the data from the data sources 104.

A user interface component 120 generates the content that is visually displayed to a user (e.g., a user associated with a customer, a system administrator, etc.) at user station 102. The user interface component 120 may also be used to retrieve user inputs through the user interface to control the operations of the topic creation engine 124 and/or message categorizer 125.

The configuration database 134 can be stored in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device could also be implemented as an electronic database system having storage on persistent and/or non-persistent storage.

Any of the components/servers in the above-described system may include a bus or other communication mechanism for communicating information, which interconnects subsystems and devices, such as processor, system memory (e.g., RAM), static storage device (e.g., ROM), disk drive (e.g., magnetic or optical), communication interface (e.g., modem or Ethernet card), display (e.g., CRT or LCD), input device (e.g., keyboard, touchscreen). The system component performs specific operations by the processor executing one or more sequences of one or more instructions contained in system memory. Such instructions may be read into system memory from another computer readable/usable medium, such as static storage device or disk drive. In alternative embodiments, hard-wired circuitry may be used in place of or in combination with software instructions to implement the invention(s). Thus, embodiments of the invention(s) are not limited to any specific combination of hardware circuitry and/or software. In one embodiment, the term "logic" shall mean any combination of software or hardware that is used to implement all or part of the invention(s).

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive. Volatile media includes dynamic memory, such as system memory. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention(s), execution of the sequences of instructions to practice the invention(s) is performed by a single computing system. According to other embodiments of the invention(s), two or more computing systems coupled by a communication link (e.g., LAN, PTSN, or wireless network) may perform the sequence of instructions required to practice the invention(s) in coordination with one another. The system component may transmit and receive messages, data, and instructions, including program, i.e., application code, through communication link and communication interface. In one or more embodiments, received program code may be executed by the processor as it is received, and/or stored in disk drive, or other non-volatile storage for later execution.

Figure 2:
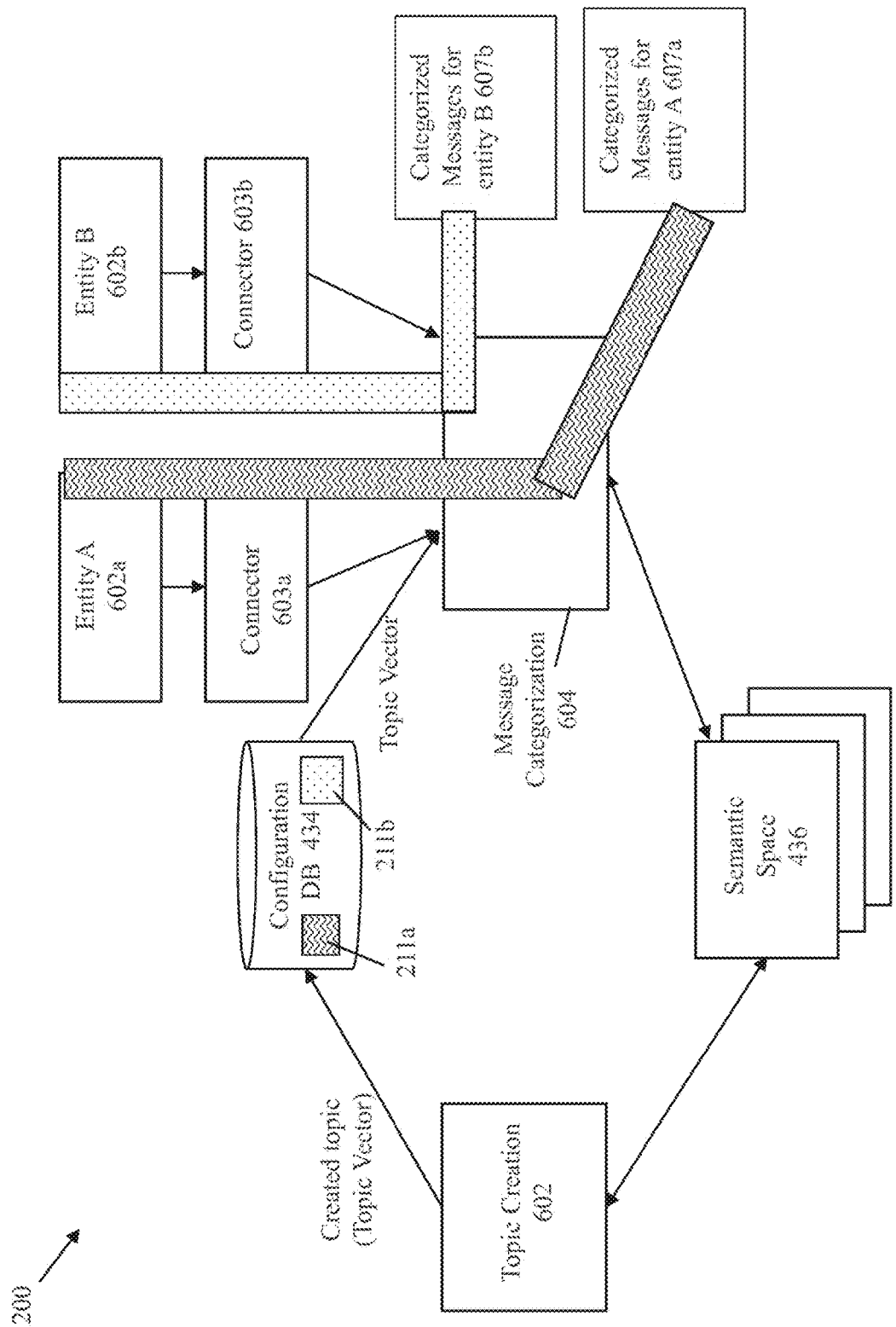
FIG. 2 illustrates an example system that performs topic creation and message categorization according to some embodiments of the invention(s).

FIG. 2 illustrates an example system 200 that represents the various components of the semantic analysis platform and how private data is kept secure within the semantic analysis platform. As shown in FIG. 2, data may be received from a first entity 602a and a second entity 602b through connectors 603a and 603b respectively. In one or more embodiments a semantic API may be used to retrieve data from the entity. In one or more embodiments, the system may identify that the data is originating from a particular data source associated with an entity based on the connector(s) that are configured for the particular entity.

A topic creation mechanism 602 can be used to create a new topic, which is saved into the configuration database 434. As shown in FIG. 2, topic vectors may be created by both Entity A 602a, and Entity B 602b. The configuration database 434 may store the created topics for both entities (e.g., 211a and 211b), in one or more embodiments.

A message categorization mechanism 604 accesses the topic vectors 211a and 211b when processing data from Entity A and Entity B respectively. The message categorization mechanism 604 uses the topic vectors to identify topics within data from social media sources. The message categorizes also accesses a semantic space 436 to vectorize the data received from the various data sources. The vectorized data is analyzed against the topic vectors associated with the entity and categorized accordingly. More details on the topic creation mechanism and the message categorization mechanisms will be provided further below.

The categorized messages are then passed to one or more downstream systems. As shown in FIG. 2, the semantically analyzed data associated with Entity A is sent downstream to a storage mechanism 507a, and the semantically analyzed data associated with Entity B is sent downstream to a storage mechanism 607b.

As noted above, the data processed by the system may be from any data source, including public social data, enterprise private data, and/or enterprise community data. One or more connectors can be built to interconnect with social media data sources. These connectors may be built using APIs provided by the social media sites to access the data on those sites. In a similar way, one or more connectors can be built to interconnect with the sites that host enterprise community data, in some embodiments.

With private data, a more flexible framework can be provided to allow organizations to themselves provide data to be processed by the system. In some embodiments, a semantic API may be provided to enable organizations to call into the system to load the private data. This approach therefore avoids the requirement to build a custom connector for each and every enterprise that seeks to load its data for processing.

Figure 3:
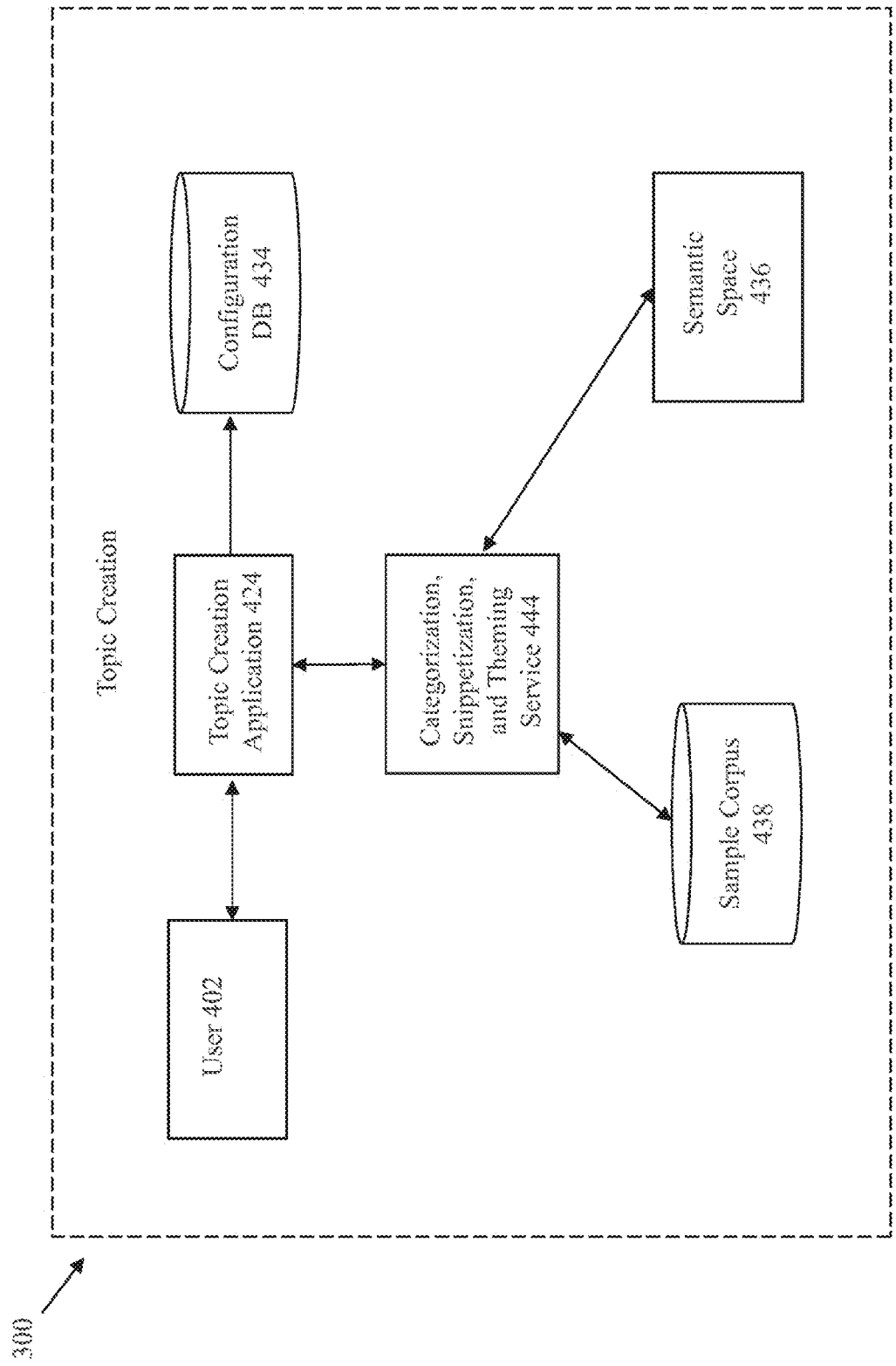
FIG. 3 illustrates an example architecture that can be used to perform topic creation according to some embodiments of the invention(s).

FIG. 3 illustrates an example architecture 300 that can be used to perform topic creation according to some embodiments of the invention(s). A topic creation mechanism/application 424 is used by a user 402 to create the new topic. The topic creation mechanism/application comprises any combination of hardware/software that is configured and/or programmed to perform the actions specified herein. New topics created by the topic creation mechanism/application 424 can be stored into a configuration database 434. In one or more embodiments, the configuration database 434 may store topics associated with a plurality of customers of the sentiment analysis system. In other embodiments, each customer may be associated with a separate configuration database 434. The following embodiments will focus on a single configuration database 434, but it should be appreciated that other variations may also be similarly implemented.

The topic creation mechanisms/application 424 interfaces with a categorization, snippetization, and theming service 444. The service 444 provides functionality to perform categorization of a given set of content using semantic analysis. The analysis may be provided over the full content of a data item, or may instead be applied to a "snippet" from the data comprising a more targeted subset of the data. Theme identification of the data may also be performed by service 444. While these functions are described in conjunction with a single service 444 in FIG. 3, it is noted that any number and/or combination of one or more components/services may be utilized in practice to accomplish the described functions.

The service 444 may access a sample corpus 438 to perform its functions. The sample corpus 438 comprises a collected set of data from which the desired analysis is to be performed. In some embodiments, the sample corpus 438 comprises a rolling three month window of collected data. In other embodiments, the sample corpus 438 may comprise sample data particular to each customer of the semantic analysis system. This may be important in order to capture the appropriate context and/or meaning of a topic as used by the customer organization. In other embodiments, a common sample corpus having a variety of data types may be used for a plurality of customers.

A semantic space 436 is accessed to perform semantic analysis upon data from the sample corpus 438. The semantic space 436 comprises a collection of vector values for a number of dimensions that are identifiable for terms within the data to be analyzed. These vector values are usable to understand the actual meaning of terms when used in different contexts. Mathematical computation and comparison of the term vectors allows one to determine the underlying meaning of various themes and documents. In one or more embodiments, a common semantic space may be used for a plurality of customers. In other embodiments, a dedicated semantic space may be employed for each customer. In other embodiments, especially for language identification or language-based semantic analysis, a different semantic space may be accessed based on a desired language.

Figure 4:
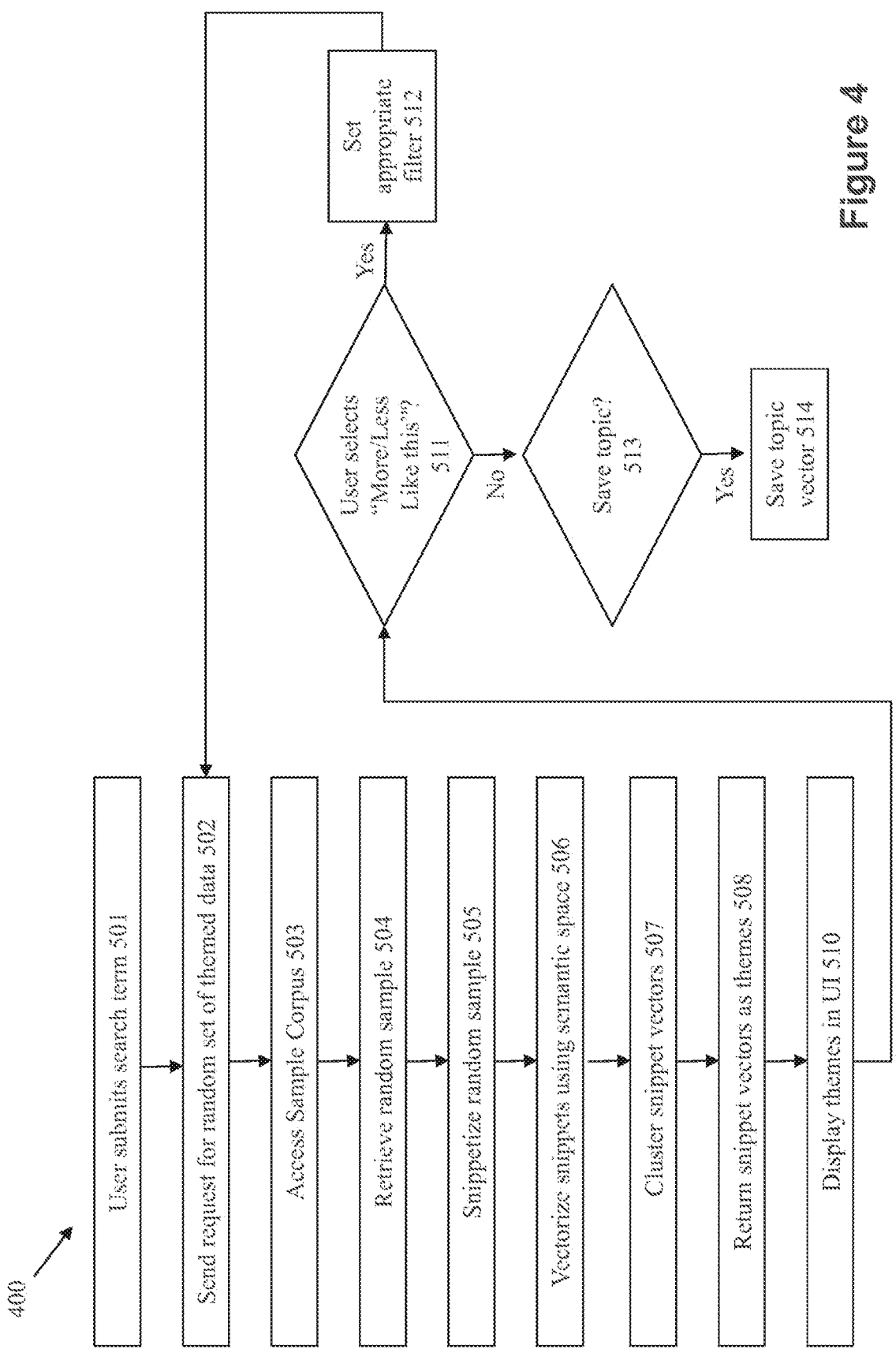
FIG. 4 shows a flowchart describing how the architecture of FIG. 3 is usable to perform topic creation.

FIG. 4 shows a flowchart 400 describing how the architecture of FIG. 3 is usable to perform topic creation. At 501, the user submits an initial search term from the user interface to the topic creation mechanism/application 424.

Next, at 502, the topic creation mechanism/application 424 sends a request for a random set of themed messages to the service 444. The request is for a random set of the data. The general idea is that, instead of performing analysis upon the entirety of the data, the analysis can be performed for a selected sampling of the data. Assuming that the samples are properly extracted from the underlying content with adequate randomness, the sampled data should provide a reasonably representative sample of data for the analysis. For example, a sample size of 500-1000 can be retrieved in some embodiments to perform the sampling. In an alternative embodiment, sampling is not employed—this approach analyzes all of the underlying content.

At 503, the service 444 accesses the sample corpus 438 to obtain a random selection of messages using the initial search term. The selection may be performed by using the search term to perform a keyword/Boolean query against the data within the sample corpus 438.

At 504, a random sample of messages is returned to the service 444. Next, at 505, the random sample of messages is snippetized into "snippets". The snippet may not be the entirety of the message content. Instead, the snippet may only contain a given number of words on either side of the occurrence of the word/topic of interest ("anchor term") within the content. For example, if the search term of interest is "Galaxy", then snippets can be created that extend 200 words in either direction from any suitable occurrence of that word within the message content. Grammatical boundaries may also be used to define the extent of a snippet, e.g., by using sentence or paragraph boundaries to adjust the cut-off point for a snippet.

One reason for using snippets instead of the entire message content is because this approach may provide a much more accurate assessment of the meaning/context or a document. For example, consider if the search term is the term "Galaxy", where only a very small portion of the message actually pertains to that term. If a snippet is identified which is centered around that term, and only that snippet of the message is semantically analyzed, then it is likely that the semantic analysis will produce a relatively accurate semantic understanding for how that terms is used in the message. On the other hand, if the entirety of the message is semantically analyzed instead, and the vast majority of the message is focused on a different subject matter from that term "galaxy", then it is possible that the semantic meaning of how the term is used may be obscured by the overwhelming weight of the rest of the message which has no pertinence to that term.

At 506, the snippets that correspond to the random sample of messages are vectorized using the semantic space 436. The semantic vectors are created across a number of dimensions for the term vectors (e.g., across 300 dimensions). The semantic vectors are mathematical representations of the semantic significance of one or more terms of interest to a user. The vectorized topics are analyzed against the vectorized messages to determine whether they can be categorized for that topic, as will be discussed below.

The vectorization is performed for all of the words within the snippets. In other words, a vector is obtained for each word in the snippet. The vectors for a given snippet are averaged together to obtain a single, overall vector for the snippet. This provides a mathematical value for the context/meaning of that snippet.

At 507, snippets are clustered together, where vector comparisons are performed so that snippets having similar vectors are clustered together. Clustering may be performed, for example, by using the KMeans++ approach to clustering.

A given cluster of vectors corresponds to a single theme. Therefore, at 508, the clustered snippets are returned as themes. At 510, the themes are displayed to the user in a user interface. The user interface includes interface elements to permit the user to select one or more of the themes to create semantic filters.

At 511, a determination is made whether the user has selected any of the themes for a new semantic filter. For example, a determination is made whether the user has selected a "More Like This" or "Less Like This" button for a given theme. If so, then at 512, a new semantic filter may be created. The actions starting from 502 may be repeated to obtain a new set of search results that accounts for the new semantic filter.

At 513, a determination is made whether the user desires to save the new topic. If so, then the topic vector is saved at 514. In one or more embodiments, the average of the vector(s) of the selected themes forms the value that corresponds to a topic vector that is saved for the new topic. This topic vector may then be saved into the configuration database 434.

Figure 5:
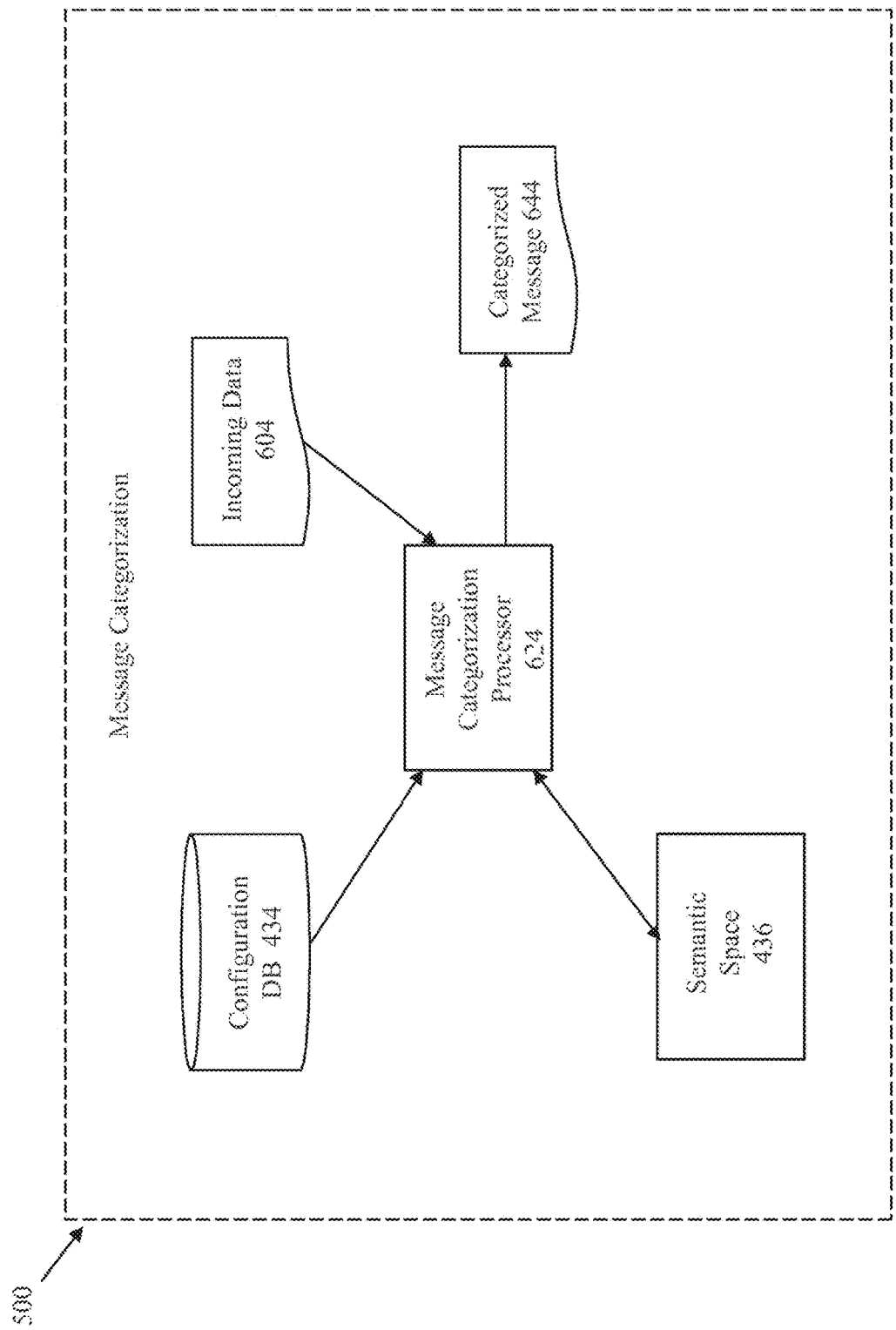
FIG. 5 illustrates an architecture of a system for performing message categorization.

FIG. 5 illustrates an architecture 500 of a system for performing message categorization. A message categorization processor 624 receives incoming data 604 from one or more sources. The message categorization processor 624 also receives topic vectors from the configuration database 434.

The message categorization processor 624 can be implemented as a pipeline processing mechanism, comprising a number of pipeline stages for the processing of data. One of the pipeline stages may pertain to categorization of messages. Other pipeline stages may be employed to perform other functions, such as spam processing, deduplication, sentiment analysis, and term analysis.

It should be appreciated that data from private sources may need to be handled differently from public social data, especially when a common multi-tenant system is used to handle data from multiple private and/or public sources. Further details on keeping data from private sources private and secure will be provided further below.

For message categorization, the message categorization processor 624 utilizes the semantic space to vectorize the message content. A comparison is performed against the topic vectors to identify one or more topics that may be associated with the message content. If any topics are identified, then the message content can be annotated and/or tagged to identify the topic. Thereafter, the categorized content 644 is released for downstream usage or storage, e.g., to be viewed using a dashboard tool or for routing to a downstream application such as a CRM (customer relations management), HR (human resources), or marketing application.

Figure 6:
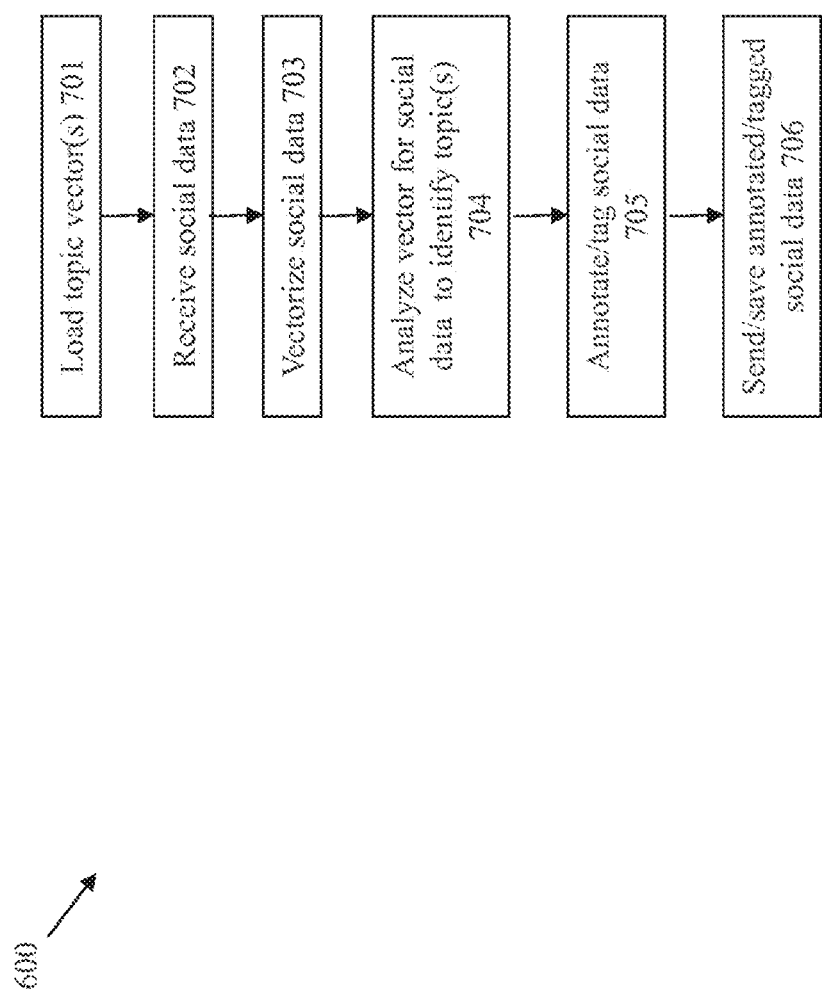
FIG. 6 illustrates a flowchart of an approach for performing message categorization using the architecture of FIG. 5.

FIG. 6 illustrates a flowchart 600 of an approach for performing message categorization using the architecture of FIG. 5. At 701, the message categorization processor 624 loads topic vectors from the configuration database 434 for any created topic(s). In a commercial setting, these topic vectors pertain, for example, to any topics/dimensions set up by a user for a given brand and/or product. In this context, the topics comprise a given brand or product name. The dimensions may pertain to consumer intent, interest, or psychographics.

At 702, an item of social media content (e.g., a message) is received by the message categorization processor 624. At 703, the message is vectorized. The semantic space 436 is accessed to vectorize the message to create a message vector.

At 704, the message vector is analyzed relative to the topic vector(s). In one or more embodiments, this may be performed, for example, by calculating the cosine of the message vector against each topic vector. The similarity of the message vector to the topic vector is computed by calculating this cosine value, to check for one of the following:
  Identical meaning: value of cosine=1
  Unrelated meaning: value of cosine=0
  Opposite meaning: value of cosine=−1
  A threshold distance to any of the above values A message that relates to one of the created topics would correspond exactly or generally to the appropriate cosine value from performing the calculations. One or more thresholds may be configured for the cosine values to determine whether or not the message matches to a topic.

At 705, any message that is identified as being associated with a given topic can be annotated and/or tagged to indicate the association. Thereafter, at 706, the annotated/tagged message exits the message processor 624 to a downstream location.

Essentially, the semantic analysis system loads one or more topic vectors, vectorizes the messages received from various sources, and compares the vectorized messages against one or more topic vectors. A few methods of analysis have been discussed above. In one or more embodiments, a similarity between the topic vector and the vectorized messages is determined. If the similarity degree is deemed to be sufficient, the vectorized messages are categorized for that topic. In one or more embodiments, the vectorized message may be annotated with the topic vector.

FIG. 7 shows a flowchart 700 of an approach to create a semantic space according to some embodiments of the invention(s). The general overview is that a learning model may be implemented to represent terms as high-dimensional vectors within the semantic space. Singular value decomposition (SVD) may be employed to reduce a matrix of terms into a set of multidimensional vectors.

At 802, incoming documents are tokenized. This action is performed in some embodiments by (a) normalizing punctuations, (b) identifying co-locations; and (c) removing stop words. Stop words to be removed may include, for example, "and", "or", "the", "to", "be", "is", "at".

At 804, term weights are computed for the tokenized content. A global frequency is computed for the terms. In addition, a global weight (e.g., entropy) is computed for the terms. The terms can also be sorted at this stage.

At 806, a matrix of the terms is created. The matrix can be formed with content passages as rows and words as columns, where cells contain the number of times that a given word is used in a given passage. The cell values are transformed into a measure of the information about the passage identity the carry. The matrix can be formed as a Harwell-Boeing matrix.

In some embodiments, the matrix is formed using the following example process:
  For each document d
    For each term t
      Create a Cell value using the global weight;

It should be appreciated that other approaches may be used to create the matrix, and the foregoing approaches are provided for illustrative purposes only.

At 808, singular value decomposition is applied to represent the words and passages as vectors in a high dimensional semantic space. At 810, the process generates (a) term vectors, (b) document vectors, and (c) diagonal matrix of singular names. The results are saved, at 812, into the semantic space.

As discussed above, it is crucial that data from enterprise private data sources be tracked and kept separate from data received from other enterprises or entities and/or other data sources. In order to ensure client confidentiality, the SaaS semantic analysis platform may implement certain system architecture features and/or database implementations that allow for data that is private to an entity to remain private and confidential. The follow disclosure will go through various system architecture embodiments that may facilitate this.

In one embodiment, separate processing pipelines may be provided for each private source of data. In this approach, a first enterprise will be assigned use of its own first private pipeline processing mechanism to perform message categorization on its private messages, and a second enterprise will be assigned use of a second private pipeline processing mechanism to perform message categorization for its private messages.

Figure 8A:
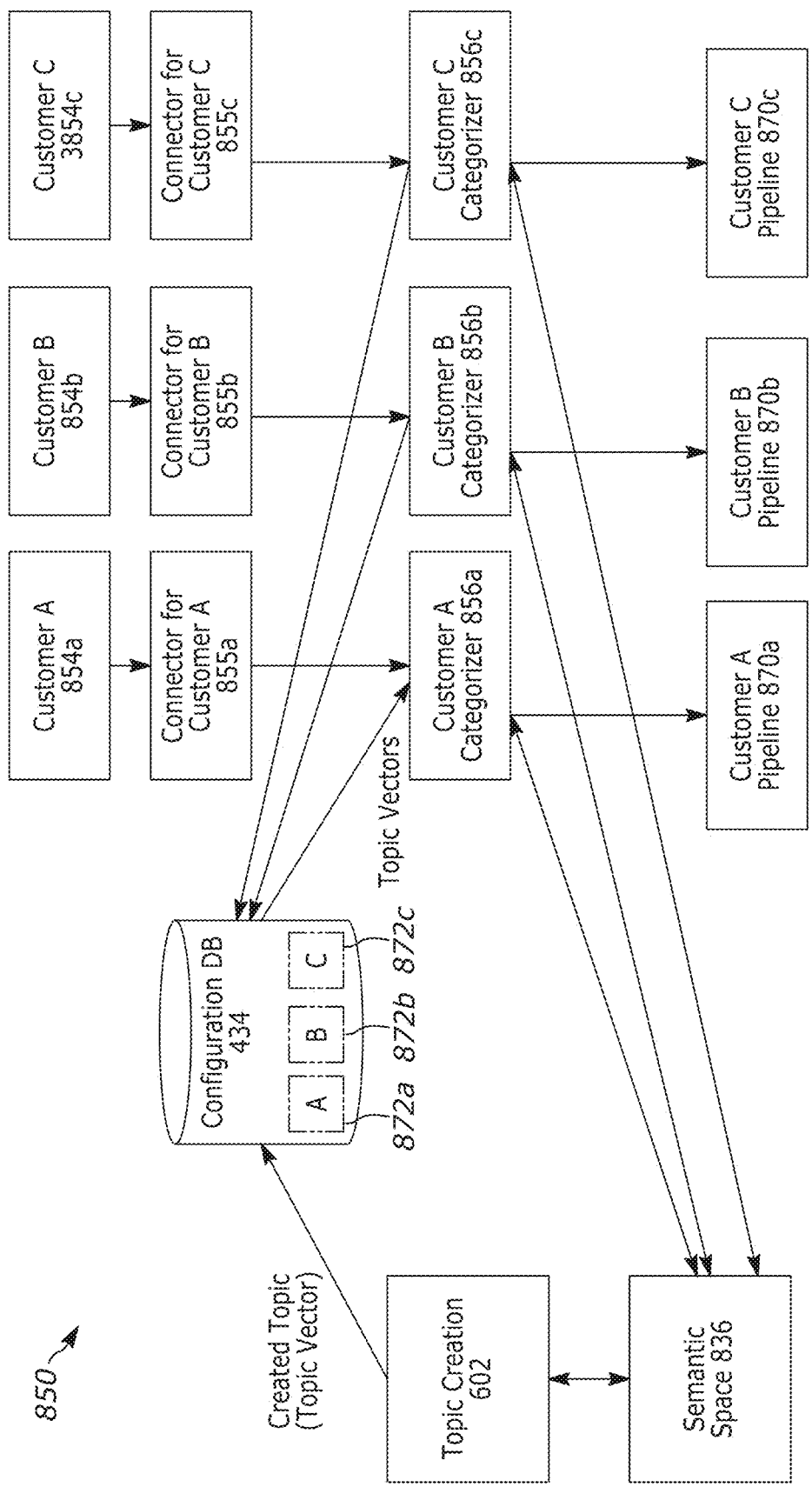

Referring now to the example system architecture 850 illustrated in FIG. 8A, data from each customer entity (e.g., customer A 854a, customer B 854b and customer C 854c) may be received through a specific connector (e.g., connector for customer A 855a, connector for customer B 855b, and connector for customer C 855c). Data received from a configured connector may automatically be assigned its own unique processing pipeline that is dedicated to perform semantic analysis only for respective entity. It should be appreciated that data from other sources (e.g., public data, community data, etc.) may be received through other sources and/or connectors as well, but is omitted in FIG. 8 for simplicity.

As shown in FIG. 8A, in one or more embodiments, as part of the separate processing pipeline provided to the plurality of customer entities, the data associated with each customer entity may be directed to a dedicated message categorizer mechanism (e.g., 856a, 856b, and 856c). Enterprise private messages may be received at the message categorizer for a particular customer. The message categorizer mechanism 856 may retrieve topic vectors for each customer from the configuration database 434. As shown in FIG. 8A, the configuration database 434 may store topic vectors created for each customer (e.g., 872a, 872b and 872c). It should be appreciated that each customer may utilize a user interface to create topic vectors of interest through the topic creation mechanism, similar to that described with respect to FIGS. 3 and 4 above.

In one or more embodiments, topic vectors associated with the customer are loaded onto the dedicated message categorizer 856. Similarly, each message categorizer 856 communicates with the semantic space 836 to form message vectors for each message associated with the customer. Similar to the process described with respect to FIGS. 5-7 above, the messages for each enterprise are categorized by comparing the topic vectors to the message vectors. As shown in FIG. 8A, the categorized messages are directed to message pipelines specific to the individual customer (e.g., 870a, 870b and 870c).

Each customer pipeline may be associated with database tables (e.g., relational tables, etc.), processors, communication hardware and software that work independently from other customer pipelines. It should be appreciated that other requested data sources (e.g., public data, community data, etc.) may be categorized by a separate common message categorizer mechanism (not shown), and those categorized messages may further be directed to the customer's individual pipeline 870, in one or more embodiments.

As will be described further below, depending on the type of service requested by the customer, the enriched data (e.g., categorized messages) stored in the message pipeline may periodically be transferred to a database structure dedicated to the customer. The customer may then access the results of the semantic analysis through a user interface of the semantic analysis system, retrieving results from the dedicated database.

In one or more embodiments, the dedicated database may be a multi-tenant database structure in which data related to multiple customer is stored in dedicated portions of the database structure. Or, in other embodiments, a virtual tenant database structure may be utilized in which separate server instance with its own database structure is allotted for each customer.

With respect to data stored in the configuration database 434, in one or more embodiments, the configuration database may have a multi-tenant architecture storing data associated with multiple customers in separate portions or separate tables. In other embodiments, each customer may be associated with a separate configuration database.

Figure 8B:
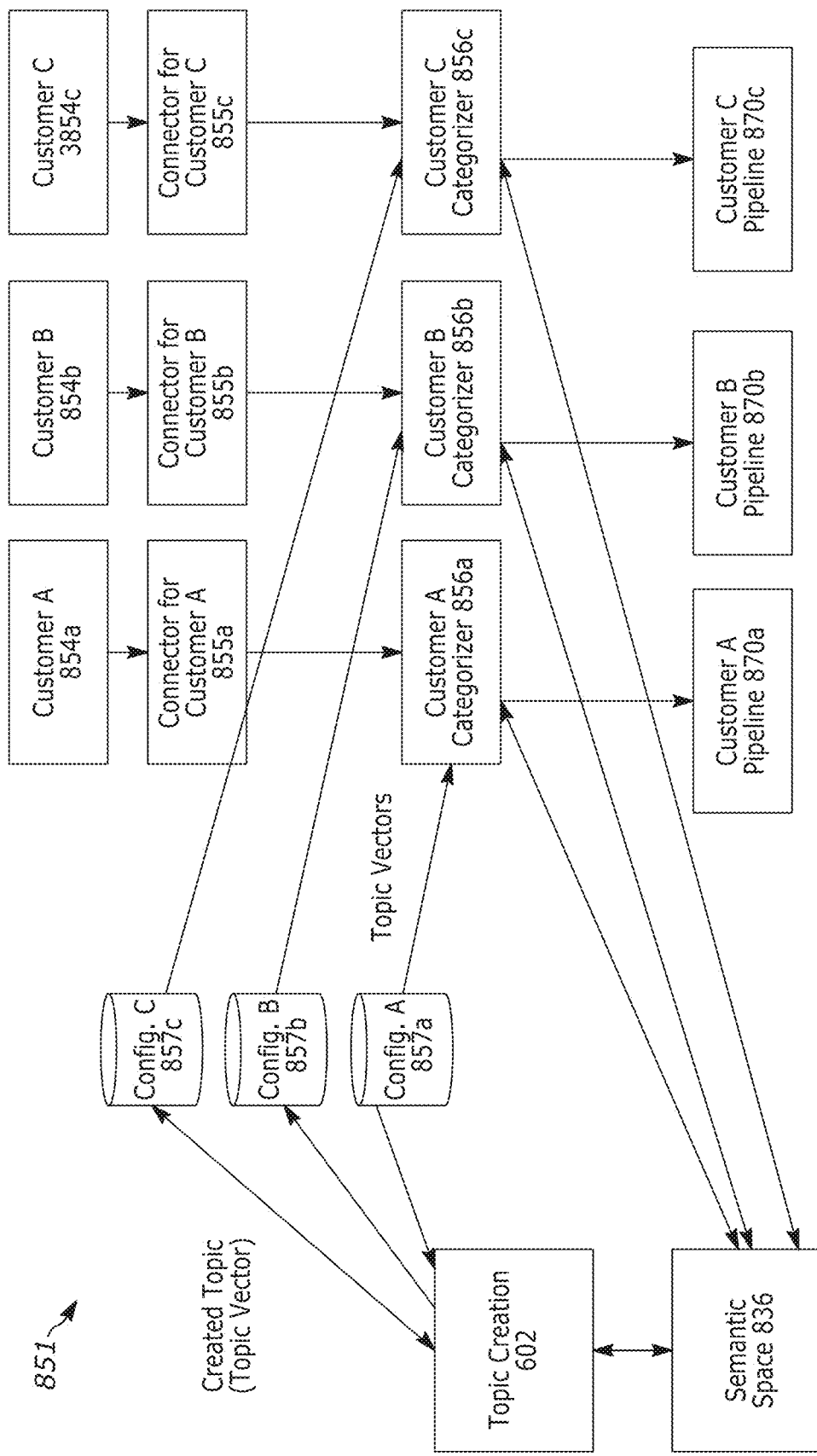

As shown in FIG. 8B, rather than storing topic vectors for a plurality of customers in the same configuration database, in one or more embodiments, a separate configuration database (e.g., 857a, 857b and 857c) and server instance may be provided to each customer such that topic vectors associated with one customer cannot be accessed by another customer. A more sophisticated database structure such as the one described in FIG. 8B may also have numerous advantageous in processing power and efficiency as well. By providing separate configuration databases and/or message categorizers and processing pipelines, server and processing resources are not divided amongst multiple customers, thereby having the effect of increasing a speed and efficiency of tasks being performed for a particular customer. For example, if a particular customer has a higher load (e.g., higher data load), and has a greater number of topics, that customer may be provided with separate resources so as to not interfere with the processing tasks related to other customers.

In yet another embodiment, a plurality of semantic spaces may be provided. It may be the case that a single semantic space 436 is not sufficient to handle message categorization for multiple enterprises. This is because the terminology of interest to a first enterprise may not be of interest to a second enterprise. For example, the term "Galaxy" may have a first meaning to a company in the mobile phone space but have an entirely different meaning to a company in the sporting equipment/apparel space. Therefore, one approach (as briefly discussed above) may be to provide a separate semantic space 436 for each customer (as needed). This approach may be initiated by checking if the common semantic space is usable, and if not, to then create the new semantic space once the need has been identified.

In other embodiments, semantic spaces may be provided for every language. For example, if a language is recognized, the system may determine which semantic space to access. If the language associated with the message is English, an English semantic space may be accessed. If the language associated with the message is Spanish, a Spanish semantic space may be accessed instead. In yet another embodiment, if the language is detected to be Chinese, a Chinese semantic space may be accessed to categorize the message. It should be appreciated that one or more embodiments nay comprise a language recognizing mechanism (not shown) that recognizes a language of a message, identifying the semantic space that should be accessed to determine the message vector of an incoming message. Additionally or alternatively, when defining the topic, customers may identify a desired language of interest, thereby indicating to the system which semantic space to access.

Figure 8C:
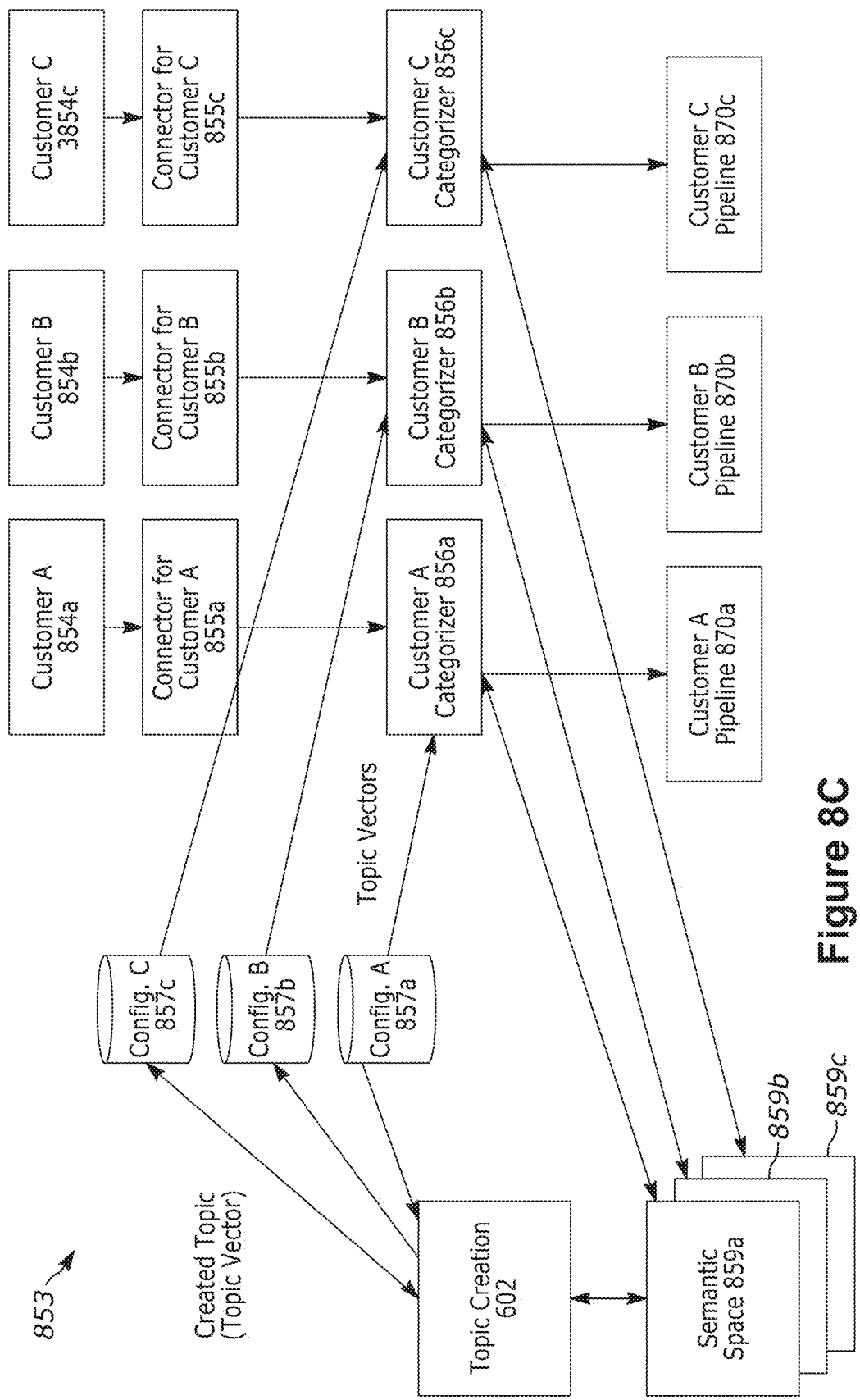

As shown in the example architecture 853 of FIG. 8C, the message categorizer for each customer (e.g., 856a, 856b and 856c) may access their respective semantic spaces (e.g., 859a, 859b and 859c) to determine the message vectors and categorize the message. In other embodiments, if the semantic space is associated with various languages, each of the message categorizers 856 may access multiple semantic spaces based on the determined language of the message. It should be appreciated that the embodiments illustrated in FIGS. 8A, 8B and 8C are provided for example purposes only, and any combination of the embodiments may be employed. For example, some embodiments may employ separate message categorizers 856, but may employ a single configuration database (e.g., FIG. 8A), but employ separate semantic spaces for each customer (e.g., FIG. 8C). Therefore, the embodiments described above should not be read as limiting, and they may be freely employed with other embodiments described herein.

Referring now to FIG. 8D, an example process flow 861 of performing message categorization for enterprise private data is provided. At 871, a set of messages may be received at the message categorizer associated with a particular customer. The data may originate from the particular enterprise through a connector mechanism associated with the customer. At 873, topic vector(s) may be retrieved from the configuration database. As discussed in detail above, each customer may have a respective configuration database, in one or more embodiments. In other words, the message categorizer associated with the customer may be programmed such that it only has access to the configuration database associated with the customer.

In other embodiments, if a common configuration database is utilized, a search may be performed within the configuration database to retrieve the topic vector(s) from a table associated with the customer. At 875, the topic vector(s) associated with the customer may be loaded at the message categorizer. At 877, the system may determine which semantic space to access. For example, there may be semantic spaces specific to the customer, in which case, the message categorizer may be programmed to only access the semantic space associated with the customer. In other embodiments, the message categorizer may work with a language recognizer, for example, to recognize the language of the message in order to determine which semantic space to access.

At 879, the determined semantic space may be accessed in order to vectorize the message. At 881, the one or more topic vectors associated with the customer may be compared to the message vector(s) in order to categorize the messages based on the created topics. At 883, the categorized messages may be directed to a pipeline that is associated with the customer. As discussed above, in one or more embodiments, the message categorizer associated with the customer may be programmed such that it can only direct messages to the pipeline associated with the given customer, and may not direct messages to other pipelines. However, in one or more embodiments, common message categorizers (e.g., categorizing public data or social media data) may additionally direct categorized messages to the pipeline associated with the customer, if needed.

Although the approaches described above help ensure that data is kept private on a structural level, a possible problem with this approach is that, in a multi-tenant system, this approach may be quite expensive and may not be easily scalable.

In an alternate embodiment, common processing pipelines may be used to process the data from multiple sources.

However, unique identifiers may be assigned to data associated with each data source to handle private messages differently from messages received from other data sources. In this approach, topics created by each enterprise are associated with that enterprise by using an identification code (e.g., customer ID) associated with that enterprise. In addition, private messages from that enterprise are also associated with the same identifier/customer ID. As the private messages are processed through the common pipeline, the unique identifier associated with the private messages is used to load topics specific for that enterprise (which are identified since they are associated with the same identifier). The private messages are then categorized using those topics, and are routed to the appropriate destination after categorization.

Figure 9A:
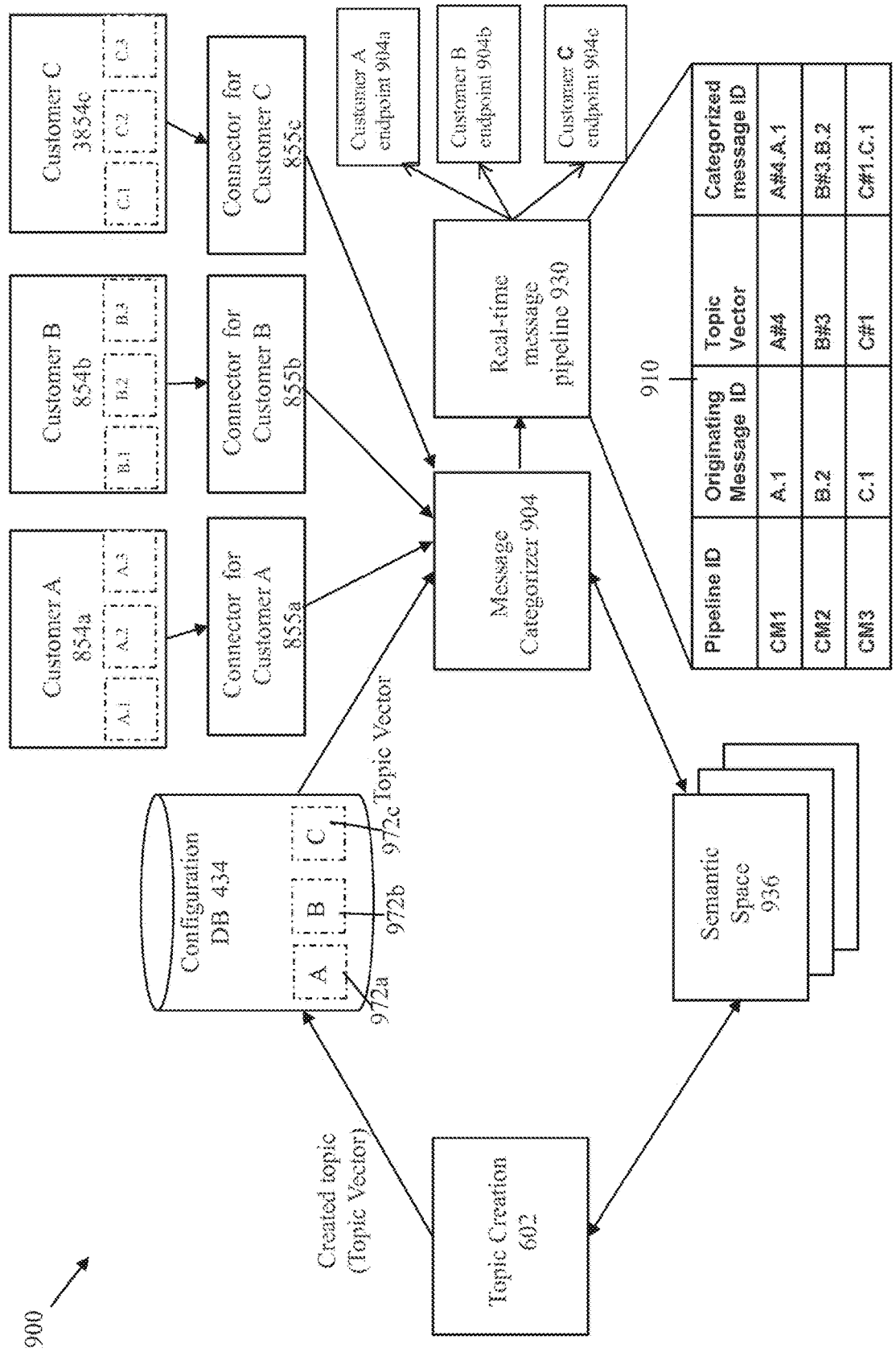
FIGS. 9A-9B illustrate various embodiments of utilizing customer IDs to maintain private data from a plurality of customers, according to some embodiments of the invention(s).

Referring now to FIG. 9A, an example system architecture 900 is provided. As shown in FIG. 9A, messages of each customer may be assigned a unique ID as soon data is received from the respective data source. The unique identification code may identify the customer, and uniquely identify the document/message. In one or more embodiments, the identification codes are assigned such that messages related to the customer entity are constantly tracked and monitored and are only routed to endpoints associated with the particular customer. As shown in FIG. 9A, messages originating from data sources for each of the customer entities (e.g., 854a, 854b and 854c) is associated/assigned with unique identifiers (e.g., A.1, A.2, B.1, etc.). In one or more embodiments, an identification assigning module (not shown) may be implemented that generates identification codes for each of the customer entities and/or data that is received from each of the customer entities. These unique identification schemes may be consistently applied through the categorized process such that the system is always aware of the source of the data, and routes the message accordingly.

Upon reaching the common message categorizer 904, topic vectors for the plurality of customers may be retrieved from the configuration database 434. As shown in FIG. 9A, topic vectors for each of the customers is also identified (e.g., represented as A, B, C), and may be stored in dedicated tables in the configuration database 434. In one or more embodiments, these topic vectors are loaded at the message categorizer 904. Message vectors may also be created by accessing a semantic space 936 (either a common semantic space or alternatively a semantic space dedicated to the customer, as discussed above). The message vector may carry the ID information of the originating message. Messages may then be categorized by comparing message vectors having the ID information associated with a particular customer with topic vectors associated with the customer. Based on this information, the message may be associated with a particular topic.

The categorized messages for the plurality of customers may then be forward to a common pipeline 930 that comprises categorized messages for all the customers. Table 910 of FIG. 9A represents a sample table illustrating how data may be differentiated and stored at the common pipeline 930. As shown in table 910, each message in the pipeline may have a pipeline ID, and may identify the originating message ID (e.g., A.1, B.2., C.1), the topic vector used to categorize the message (e.g., A #4, B #3, C #1), and may associated with the message ID and the topic vector ID to create a unique ID for each categorized message (e.g., A #4.A.1., B #3.B.2, C #1.C.1, etc.).

In one or more embodiments, based on the identification code of the categorized messages, the messages may be appropriately routed to endpoints defined for the customers (e.g., 904a, 904b, 904c).

Figure 9B:
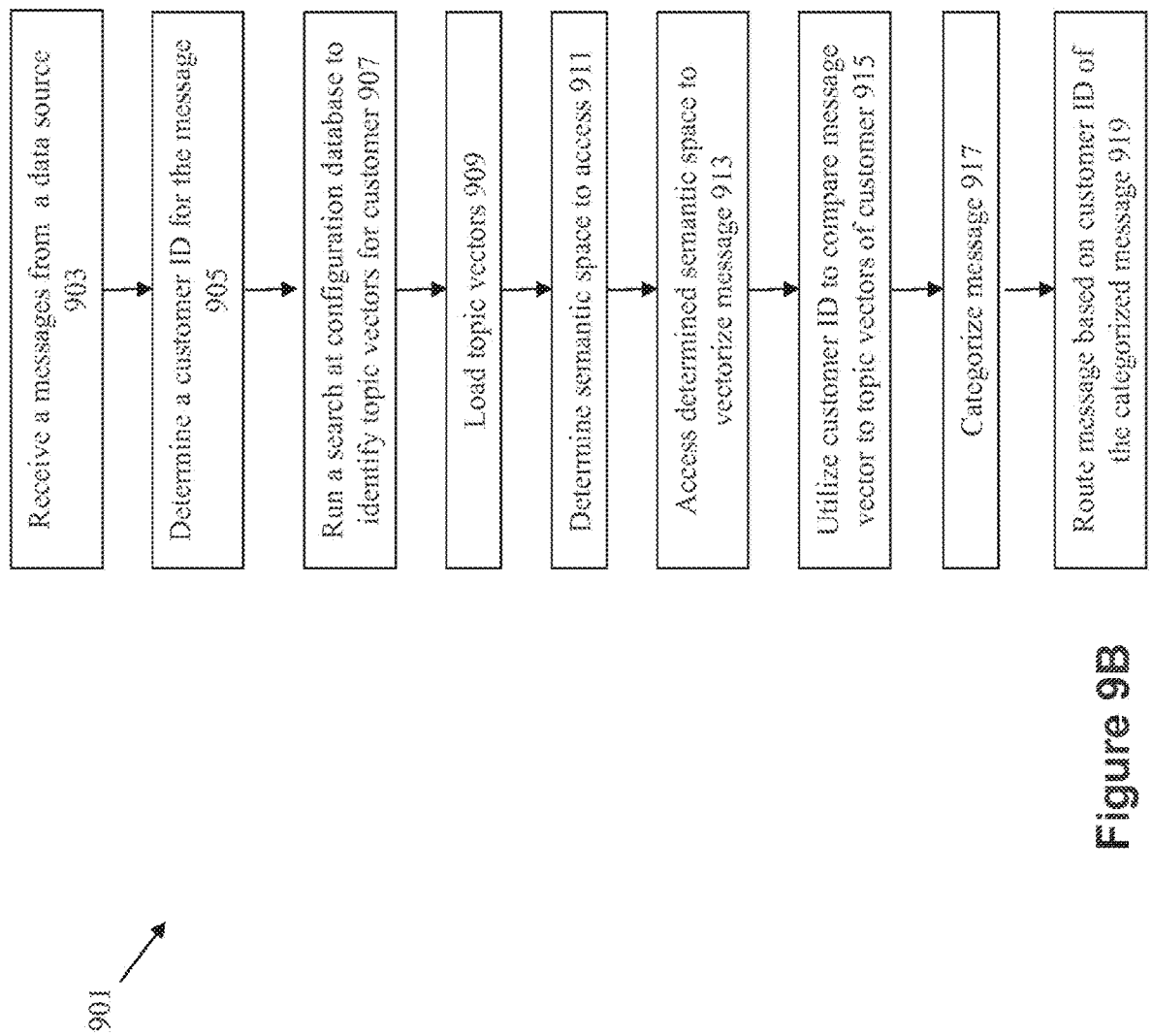

Referring now to FIG. 9B, an example method 901 of utilizing IDs to keep data separate is illustrated. At 903, messages may be received from a data source (e.g., from a public data source, a private data source, etc.). At 905, a customer ID may be determined for the message to identify the customer. For example, a search may be run at a local database to identify the customer by the customer ID. At 907, based on the identified customer, a search may be run at the configuration database to retrieve topic vector(s) associated with the identified customer. At 909, the topic vectors may be loaded at the message categorizer.

At 909, a semantic space to be accessed may be determined. As described above, in some embodiments, there may be a single semantic space, such that all the messages are vectorized based on the same semantic space. In other embodiments, a semantic space associated with the customer may be identified based on the customer ID may be determined. At 911, the determined semantic space may be accessed in order to vectorize the message. At 913, the vectorized message may be compared to the loaded topic vector(s) based on the customer ID. In other words, messages associated with a particular customer are only compared against the topic vector(s) for the customer.

At 917, the message may be accordingly categorized based on the comparison. At 919, the message may be routed to a destination associated with the customer by utilizing the customer ID.

As noted above, an API (referred to herein as a "semantic API") can be used to provide external enterprise data into the semantic analysis system. This implements semantic operations to expose semantic abilities to others through the API-based interface. In some embodiments, the interface comprises a RESTful API in JSON, and is implemented using HTTP Basic over SSL.

Figure 10A:
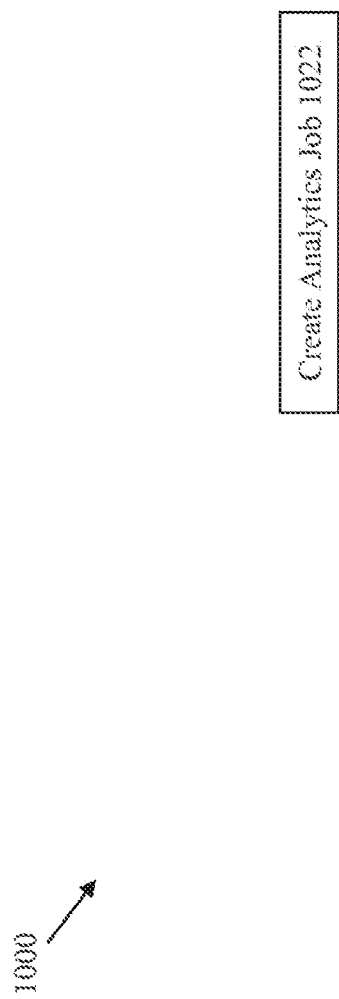
FIG. 10A shows a flowchart of an approach to implement this approach according to some embodiments of the invention(s).

FIG. 10A shows a flowchart 1000 of an approach to implement this approach according to some embodiments of the invention(s). At 1022, the process begins by creating an analytics job in the system using the API. In some embodiments, the analytics job comprises a document set having one or more documents, where each document includes an ID and some text.

The job may also include a list of one or more enrichments to be implemented for the document processing. Examples of such enrichments include language identification, categorization, semantic tagging, sentiment analysis, and theming. Language identification pertains to the functionality of identifying a language or the document. Categorization refers to the process described above to identify a topic for the document. Themes refer to the process of performing theme identification for the document. Sentiment analysis refers to the process of identifying a sentiment (e.g., tonality) for the document. Semantic tagging refers to the categorization of semantic indicators for the document.

At 1024, the job is then executed to be run by the system. It should be appreciated that the semantic analysis detailed above may be used on the provided document set in order to provide the enrichments back to the requesting organization. The document set, if loaded, and the individual documents are then processed by the system. At 1026, the analytics job is polled until the status of the job indicates that is has been "processed".

Figure 10B:
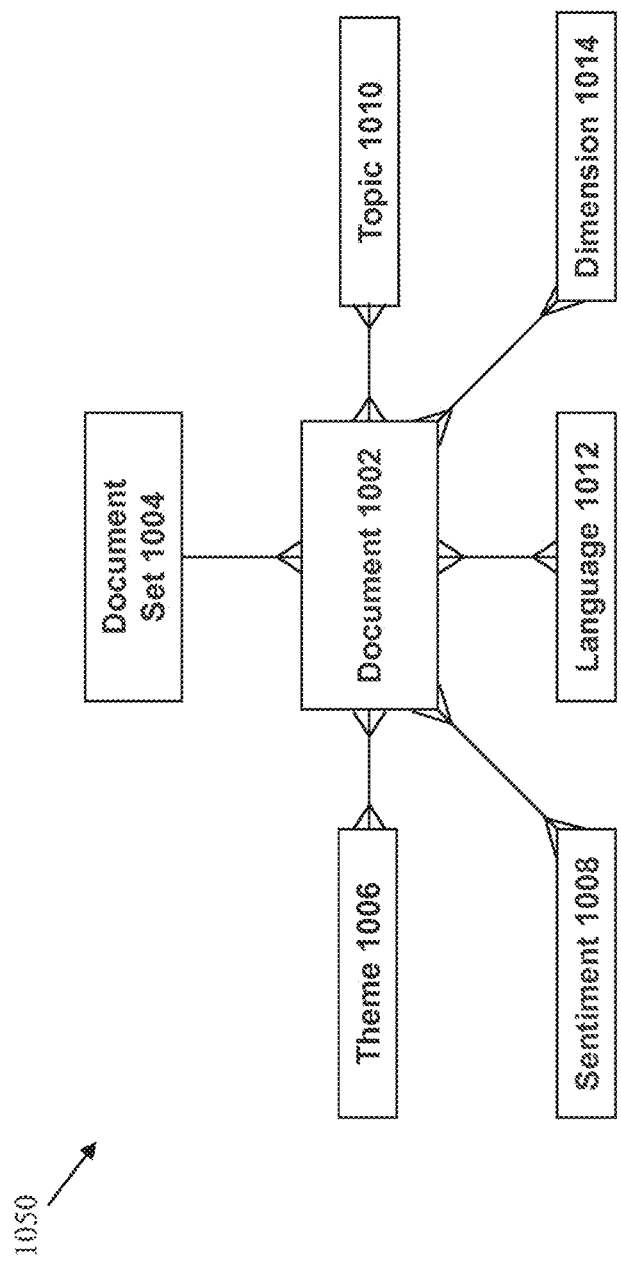
FIG. 10B provides a conceptual view of the documents to be processed by the analytics job through the semantics API.

FIG. 10B provides a conceptual view 1050 of the documents 1002 to be processed by the analytics job through the semantics API. In this embodiment, the API is oriented towards a set of documents. The set of documents may be, for example, a set of emails and/or messages of an enterprise. As shown in FIG. 10B, the document set 1004 may comprise individual documents 1002 that are to be processed by the semantic analysis system. In one or more embodiments, the enterprise may also request a set of enrichments to be performed on the data (e.g., a type of sentiment, a range of data, one or more themes, etc.)

Each document 1002 may undergo processing corresponding to desired enrichments. As shown in FIG. 10B, the enrichment may relate to identifying one or more themes 1006 in the document 1002. In one or more embodiments, the enrichment may pertain to analyzing a sentiment 1008 in the document 1002. In one or more embodiments, the enrichment may pertain to identifying a language 1012 in the document 1002. In other embodiments, the enrichment may pertain to identifying topics 1010 in a document 1002. In yet other embodiments, the enrichment may relate to determining dimensions 1014 in the document 1002. Other examples of enrichments may include language identification, categorization, semantic tagging, sentiment analysis, and theming.

Figure 11A:
FIG. 11A provides an illustration of an example POST call.

A POST call can be made to create the job, and to specify the documents and/or operations for the job. The POST call may also detail the type of enrichments desired by the customer or enterprise. FIG. 11A provides an illustration 1100 of an example POST call (showing an example of what the customer may request for the processing). As shown in the illustrative embodiment of FIG. 11, the POST call 1100 may identify the host API (e.g., "api.collectiveintellect.com"), define one or more content types and respective identification (e.g., "customer_id", "documents", etc.), and also request a set of enrichments (e.g., "language_identification," "categorization," etc.).

Referring now to FIG. 11B, a GET call can be made to get the analytics job from the semantic analysis system, including the annotated documents (e.g., with enrichments) that have been processed. FIG. 11B is an illustration 1150 of an example GET call (showing examples of what the customer may receive in response to the POST call). As shown in FIG. 11B, the GET call 1150 may not only include the host API (e.g., "api.collectiveintellect.com"), but may also include the results of analysis (e.g., "language": "Chinese", "sentiment": "positive", etc.). In other words, by using the semantic API, various entities (e.g., enterprises, organizations, individuals, etc.) may provide the system with data to be analyzed through the semantic API (e.g., through a POST call), and may simply receive the results of the analysis through the API (e.g., through a GET call).

In one or more embodiments, a copy of the analysis may be stored in a local database of the semantic analysis system. In other embodiments, the documents along with the analysis are simply sent back to the enterprise requesting the analysis through the semantic API, and no copy of the documents or the messages are stored in the semantic analysis system.

Figure 12:
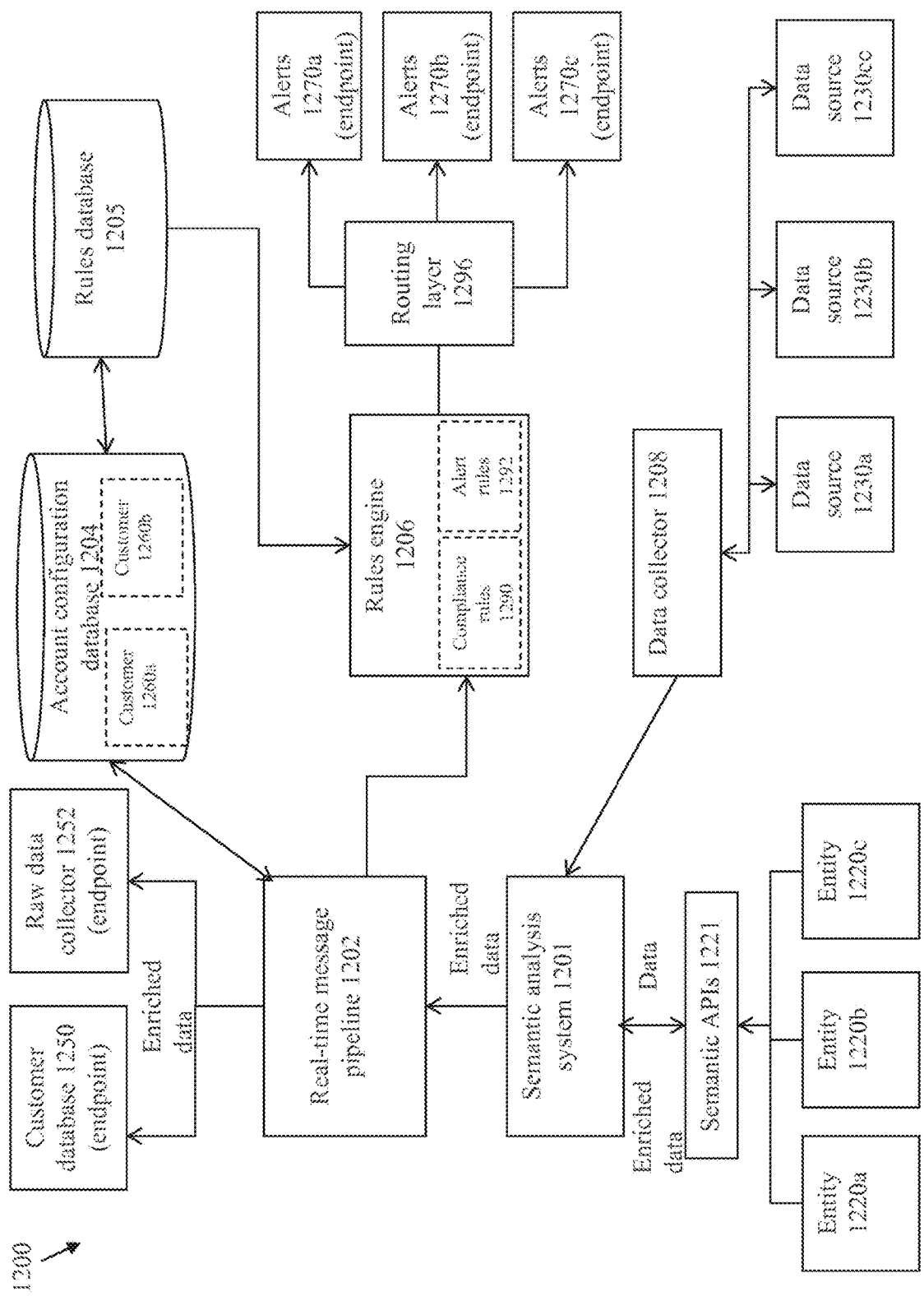
FIG. 12 illustrates a detailed system architecture of a rules-based routing approach.

Semantically analyzed data (e.g., data that is annotated and/or enriched) may be routed to one or more endpoints such that it can be consumed by customer entities of the semantic analysis system. Referring now to FIG. 12, a general system architecture representing the semantic analysis system and various endpoints is illustrated. At the center of FIG. 12, is the semantic analysis system 1201 that takes data from various sources, and performs semantic analysis as described in the previous figures (FIGS. 1-7). It should be appreciated that the various sub-components are omitted in FIG. 12 for simplicity, but the semantic analysis system 1201 may comprise all the components and/or additional components in various embodiments.

As shown in FIG. 12, the semantic analysis system 1201 receives data from multiple data sources (e.g., 1230a, 1230b, 1230n, etc.) Data coming from the various sources 1230 may be collected and/or aggregated by a data collector 1208 that aggregates the data for consumption by the semantic analysis system 1201. As discussed in detail above, the data sources 1230 may be public data or enterprise private data receiving directly from customers, in one or more embodiments. In one or more embodiments, the enterprise private data may be kept separate from other data sources through a multi-tenant database architecture and/or an identification mechanism such that enterprise data associated with a particular customer is kept private and confidential. In one or more embodiments, the data collector 1208 may format and/or sort the data based on preferences of the semantic analysis system 1201.

As shown in FIG. 12, in addition to data collected from various data sources 1230 (e.g., public data, social media data, enterprise data, community data, etc.), the semantic analysis system may also receive data directly from one or more entities (e.g., 1220a, 1220b, 1220n, etc.) through respective semantic APIs 1221. In one or more embodiments, the various entities 1220 may provide enterprise private data (e.g., emails, private communications, etc.) that comprise identification details (e.g., document ID, text ID, etc.), and submit a POST call (e.g., FIG. 10) identifying the documents to be analyzed by the semantic analysis system. Similarly, a GET call (e.g., FIG. 11) may be submitted to retrieve the results of analysis (e.g., enriched data) from the semantic analysis system 1201.

In other words, based on the authorization and access provided to the various entities 1220, data may be submitted for semantic analysis through the semantic API 1221. It should be appreciated that data coming from the entities 1220 may be kept separate from data that is received from other data sources 1230. In one or more embodiments, data coming from the entities 1220 may be tagged and/or identified (e.g., document ID, customer ID, etc.) such that the data is never stored locally at the semantic analysis system 1201. Rather, data coming from the entities 1220 may go through a different pipeline, such that the identified documents are analyzed and annotated with various enrichments and simply returned back to the entity requesting semantic analysis. Thus, enriched data being returned to the requesting entities 1220 may be considered one endpoint of the semantic analysis system 1201.

As discussed above, while some entities may utilize semantic APIs to provide enterprise private data, other entities may have a subscription plan with the semantic analysis system such that private data, along with public data is semantically analyzed, and either routed back to the customer, or to a dedicated database within the semantic analysis platform. Various organizations may be interested in semantic analysis of data at large (e.g., data from data sources 1230). In other words, rather than having to constantly identify data (e.g., a set of documents) to be periodically submitted to the semantic analysis system 1201 through the semantic API, customers may be interested in receiving results of semantic analysis on global data from various data sources. For example, a beverage company may be interested in the results of semantic analysis to observe trends in how the beverage is being perceived, not just within the company, but in various public media outlets and/or social media websites. To this end, semantically analyzed data (e.g., based on created topics) may be routed such that it may be advantageously (and conveniently) consumed by various customers.

As shown in FIG. 12, the enriched data from the semantic analysis system 1201 may be directed to a real-time message pipeline 1202 that comprises enriched data for all the topics created by all the customers of the semantic analysis system 1201, in one or more embodiments. As discussed briefly above, In one or more embodiments, the real-time message pipeline 1202 comprises the results of the categorization process described with reference to FIGS. 5 and 6.

In one or more embodiments, an account configuration database 1204 may be consulted to determine how the categorized messages must be routed. For example, depending on the preferences of the customer, the enriched data (e.g., categorized messages) may be routed to different endpoints. The account configuration database 1204 may store a set of preferences and/or payment details associated with the customer. In one or more embodiments, the real-time message pipeline 1202 may comprise a processing component that determines the topics related to a particular client by consulting the account configuration database 1204, and may direct the enriched data to the appropriate endpoint.

The account configuration database 1204 may comprise a table identifying various customers, topics created by each customer, a preferred endpoint of the customer, payment details, etc. In one or more embodiments, the preferred endpoint may simply be a database 1250 dedicated to the customer. In one or more embodiments, data from the real-time message pipelines 1202 may be periodically directed to the database 1250 by consulting the account configuration database. For example, a retrieval agent (not shown) may be configured to periodically (e.g., daily, hourly, weekly, etc.) access the account configuration database 1204, and retrieve any updates to the categorized messages for a particular topic associated with the customer.

These updates may be stored in the dedicated database 1250 that may be accessed by the customer through a user interface (not shown). It should be appreciated that the user interface may be utilized by the customer to define topics of interest through the topic creation mechanism detailed in FIGS. 3 and 4. Parameters associated with the topic created by the customer may be stored in the account configuration database 1204 and/or the rules database 1205.

Another endpoint may be a raw data collector 1252. The raw data collector 1252 may simply be a datafeed that collects messages associated with various topics created by the user, and stored in a file server. In one or more embodiments, the data in the datafeed may be stored in a raw format such that customers can perform additional analysis on the raw data. This data may be collected by the customer from the datafeed. For example, a set of messages associated with the created topic may be collected in the datafeed and stored in the file server. The customer may periodically collect the data from the file server in high volumes in order to perform personalized company-specific analysis as needed. In one or more embodiments, the datafeed comprises enrichments provided by the semantic analysis system 1201. As discussed above, the account configuration database 1204 may be consulted to determine that the preferred endpoint for a particular customer is the raw data collector 1252.

In yet another embodiment, the endpoint may be external to the semantic analysis system, and may have to be routed out of the semantic analysis system, and directly to a customer requesting the enriched data. To this end, the enriched data may be directed to a rules engine 1206 which may appropriately route the data to various customer applications or endpoints. As shown in FIG. 12, the account configuration database 1204 may be consulted to determine that the preferred endpoint for the particular customer is the rules engine 1206. The rules engine 1206 may consult a rules database to determine one or more applicable rules based on which the enriched data is routed to various customer applications. Further details on routing of data from the semantic analysis platform is disclosed in U.S. patent application Ser. No. 14/815,692, incorporated by reference above.

System Architecture Overview

Figure 13:
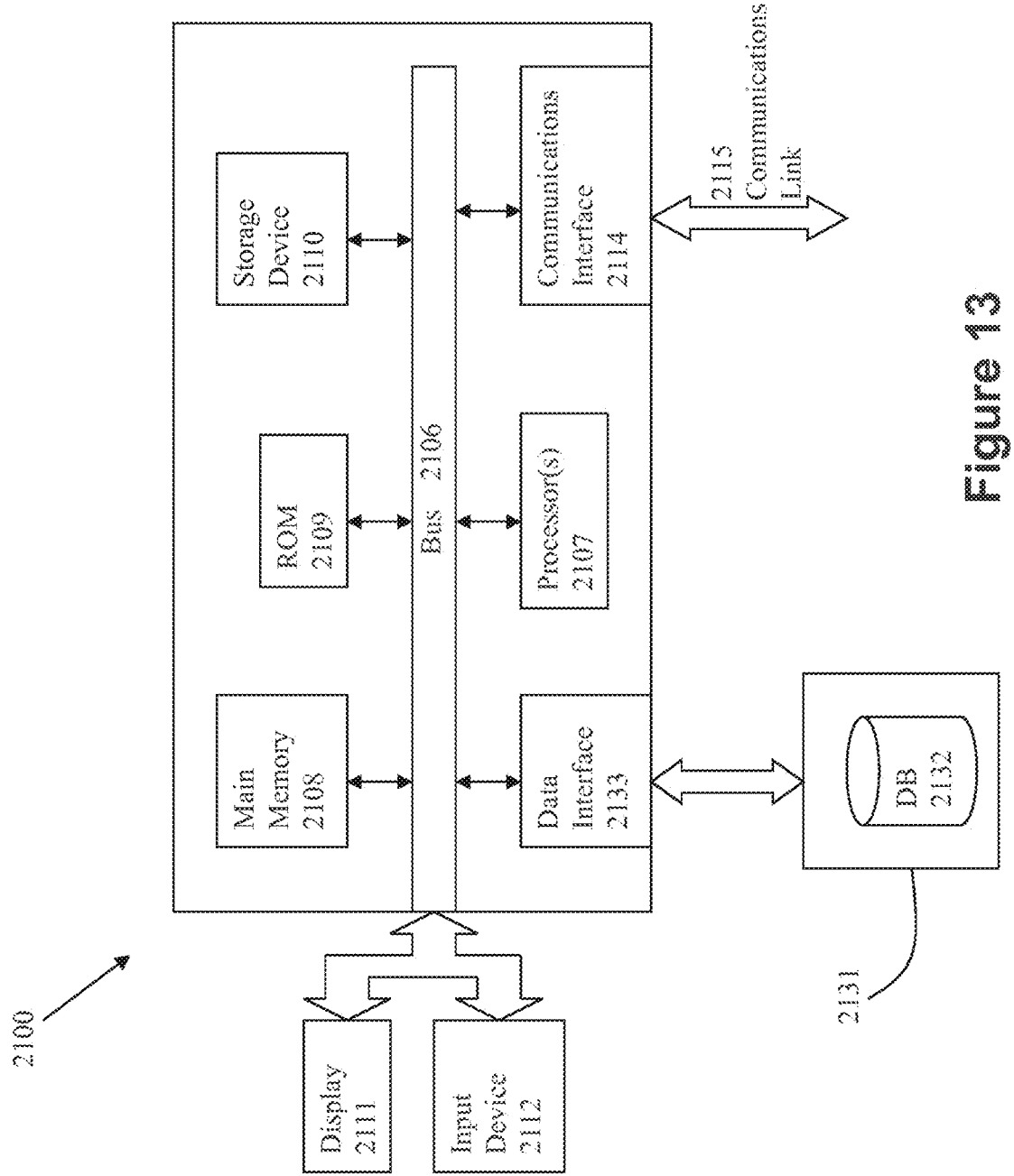
FIG. 13 depicts a computerized system on which an embodiment of the invention(s) can be implemented.

FIG. 13 is a block diagram of an illustrative computing system 2100 suitable for implementing an embodiment of the present invention(s). Computer system 2100 includes a bus 2106 or other communication mechanism for communicating information, which interconnects subsystems and devices, such as processor 2107, system memory 2108 (e.g., RAM), static storage device 2109 (e.g., ROM), disk drive 2110 (e.g., magnetic or optical), communication interface 2114 (e.g., modem or Ethernet card), display 2111 (e.g., CRT or LCD), input device 2112 (e.g., keyboard), and cursor control.

According to one embodiment of the invention(s), computer system 2100 performs specific operations by processor 2107 executing one or more sequences of one or more instructions contained in system memory 2108. Such instructions may be read into system memory 2108 from another computer readable/usable medium, such as static storage device 2109 or disk drive 2110. In alternative embodiments, hard-wired circuitry may be used in place of or in combination with software instructions to implement the invention(s). Thus, embodiments of the invention(s) are not limited to any specific combination of hardware circuitry and/or software. In one embodiment, the term "logic" shall mean any combination of software or hardware that is used to implement all or part of the invention(s).

Any usable medium can be used to participate in providing instructions to processor 2107 for execution. Such a medium may take many forms, including but not limited to, non-volatile media and volatile media. Non-volatile media includes, for example, optical or magnetic disks, such as disk drive 2110. Volatile media includes dynamic memory, such as system memory 2108.

In an embodiment of the invention(s), execution of the sequences of instructions to practice the invention(s) is performed by a single computer system 2100. According to other embodiments of the invention(s), two or more computer systems 2100 coupled by communication link 2115 (e.g., LAN, PTSN, or wireless network) may perform the sequence of instructions required to practice the invention(s) in coordination with one another.

Computer system 2100 may transmit and receive messages, data, and instructions, including program, i.e., application code, through communication link 2115 and communication interface 2114. Received program code may be executed by processor 2107 as it is received, and/or stored in disk drive 2110, or other non-volatile storage for later execution.

In the foregoing specification, the invention(s) has been described with reference to specific embodiments thereof. It will, however, be evident that various modifications and changes may be made thereto without departing from the broader spirit and scope of the invention(s). For example, the above-described process flows are described with reference to a particular ordering of process actions. However, the ordering of many of the described process actions may be changed without affecting the scope or operation of the invention(s). The specification and drawings are, accordingly, to be regarded in an illustrative rather than restrictive sense.

What is claimed is:

1. A method comprising:
receiving an uncategorized message from a first tenant of a plurality of tenants of a multi-tenant cloud service;
responsive to receiving the uncategorized message:
identifying, by the multi-tenant cloud service, a semantic space associated with the first tenant based at least in part on a first attribute of the first tenant, wherein the semantic space is unique and dedicated to the first tenant relative to other tenants of the plurality of tenants, wherein the semantic space includes a collection of vector values that are unique to the first tenant relative to the other tenants of the plurality of tenants and represent one or more semantic meanings of one or more terms within the semantic space; and
identifying, by the multi-tenant cloud service, a set of one or more topic vectors associated with the first tenant;
generating, by the multi-tenant cloud service, a message vector as a function of at least a subset of vector values from the collection of vector values that are unique to the first tenant relative to the other tenants of the plurality of tenants;
performing, by the multi-tenant cloud service, a semantic analysis on the uncategorized message, the semantic analysis comparing the message vector to the set of one or more topic vectors associated with the first tenant to categorize the uncategorized message for the first tenant.

2. The method of claim 1, wherein the semantic space is identified based at least in part on a unique identifier associated with the first tenant.

3. The method of claim 1, wherein the semantic space is further identified based at least in part on a language associated with the uncategorized message.

4. The method of claim 1, wherein the semantic space associated with the first tenant defines a meaning of a particular term for the first tenant; wherein a second semantic space associated with a second tenant defines a different meaning of the particular term for the second tenant; wherein the first semantic space is used to generate message vectors for the first tenant; wherein the second semantic space is used to generate message vectors for the second tenant.

5. The method of claim 1, wherein comparing the message vector to the set of one or more topic vectors associated with the first tenant to categorize the uncategorized message for the first tenant comprising computing a similarity measure for a particular topic vector based on said comparing the message vector to the set of one or more topic vectors; and determining whether the similarity measure satisfies a threshold; and responsive to determining that the similarity measure satisfies a threshold, categorizing the uncategorized message for a topic associated with the particular topic vector.

6. The method of claim 1, wherein generating the message vector comprises: generating a snippet of the uncategorized message; wherein the snippet includes a threshold number of words on either side of an anchor term in the uncategorized message; and generating a semantic vector that includes values representing a semantic significance for terms included in the snippet of the uncategorized message, wherein the semantic significance for the terms is determined based at least in part on the semantic space associated with the first tenant.

7. The method of claim 1, further comprising: performing semantic analysis of uncategorized messaged for the plurality of tenants using separate private pipelines; wherein different private pipelines perform semantic analysis only for a tenant to which the private pipeline is dedicated.

8. The method of claim 1, further comprising: assigning the uncategorized message a unique identifier associated with the first tenant; wherein the multi-tenant cloud service identifies the one or more topic vectors and the semantic space based at least in part on the unique identifier associated with the first tenant.

9. The method of claim 1, wherein the uncategorized message is received through a semantic application programming interface (API) that exposes the semantic analysis of the multi-tenant cloud service to the first tenant.

10. One or more non-transitory computer-readable media storing instructions which, when executed by one or more hardware processors, cause:
receiving an uncategorized message from a first tenant of a plurality of tenants of a multi-tenant cloud service;
responsive to receiving the uncategorized message:
identifying, by the multi-tenant cloud service, a semantic space associated with the first tenant based at least in part on a first attribute of the first tenant, wherein the semantic space is unique and dedicated to the first tenant relative to other tenants of the plurality of tenants, wherein the semantic space includes a collection of vector values that are unique to the first tenant relative to the other tenants of the plurality of tenants and represent one or more semantic meanings of one or more terms within the semantic space; and
identifying, by the multi-tenant cloud service, a set of one or more topic vectors associated with the first tenant;
generating, by the multi-tenant cloud service, a message vector as a function of at least a subset of vector values from the collection of vector values that are unique to the first tenant relative to the other tenants of the plurality of tenants;
performing, by the multi-tenant cloud service, a semantic analysis on the uncategorized message, the semantic analysis comparing the message vector to the set of one or more topic vectors associated with the first tenant to categorize the uncategorized message for the first tenant.

11. The media of claim 10, wherein the semantic space is identified based at least in part on a unique identifier associated with the first tenant.

12. The media of claim 10, wherein the semantic space is further identified based at least in part on a language associated with the uncategorized message.

13. The media of claim 10, wherein the semantic space associated with the first tenant defines a meaning of a particular term for the first tenant; wherein a second semantic space associated with a second tenant defines a different meaning of the particular term for the second tenant; wherein the first semantic space is used to generate message vectors for the first tenant; wherein the second semantic space is used to generate message vectors for the second tenant.

14. The media of claim 10, wherein comparing the message vector to the set of one or more topic vectors associated with the first tenant to categorize the uncategorized message for the first tenant comprises: computing a similarity measure for a particular topic vector based on said comparing the message vector to the set of one or more topic vectors; and determining whether the similarity measure satisfies a threshold; and responsive to determining that the similarity measure satisfies a threshold, categorizing the uncategorized message for a topic associated with the particular topic vector.

15. The media of claim 10, wherein generating the message vector comprising generating a snippet of the uncategorized message; wherein the snippet includes a threshold number of words on either side of an anchor term in the uncategorized message; and generating a semantic vector that includes values representing a semantic significance for terms included in the snippet of the uncategorized message, wherein the semantic significance for the terms is determined based at least in part on the semantic space associated with the first tenant.

16. The media of claim 10, wherein the instructions further cause: performing semantic analysis of uncategorized messaged for the plurality of tenants using separate private pipelines; wherein different private pipelines perform semantic analysis only for a tenant to which the private pipeline is dedicated.

17. The media of claim 10, wherein the instructions further cause: assigning the uncategorized message a unique identifier associated with the first tenant; wherein the multi-tenant cloud service identifies the one or more topic vectors and the semantic space based at least in part on the unique identifier associated with the first tenant.

18. The media of claim 10, wherein the uncategorized message is received through a semantic application programming interface (API) that exposes the semantic analysis of the multi-tenant cloud service to the first tenant.

19. A system comprising:
one or more hardware processors;
one or more non-transitory computer readable media storing instructions which, when executed by the one or more hardware processors, cause:
receiving an uncategorized message from a first tenant of a plurality of tenants of a multi-tenant cloud service;
responsive to receiving the uncategorized message:
identifying, by the multi-tenant cloud service, a semantic space associated with the first tenant based at least in part on a first attribute of the first tenant, wherein the semantic space is unique and dedicated to the first tenant relative to other tenants of the plurality of tenants, wherein the semantic space includes a collection of vector values that are unique to the first tenant relative to the other tenants of the plurality of tenants and represent one or more semantic meanings of one or more terms within the semantic space; and
identifying, by the multi-tenant cloud service, a set of one or more topic vectors associated with the first tenant;
generating, by the multi-tenant cloud service, a message vector as a function of at least a subset of vector values from the collection of vector values that are unique to the first tenant relative to the other tenants of the plurality of tenants;
performing, by the multi-tenant cloud service, a semantic analysis on the uncategorized message, the semantic analysis comparing the message vector to the set of one or more topic vectors associated with the first tenant to categorize the uncategorized message for the first tenant.

20. The system of claim 19, wherein the subset of vector values from the collection of vector values include a respective vector value selected from the collection of vector values unique to the first tenant for each respective word in a snippet within the uncategorized message; wherein generating the message vector comprises averaging the subset of vector values.

* * * * *

UNITED STATES PATENT AND TRADEMARK OFFICE
CERTIFICATE OF CORRECTION

PATENT NO. : 12,288,033 B2
APPLICATION NO. : 17/580054
DATED : April 29, 2025
INVENTOR(S) : Setayesh et al.

It is certified that error appears in the above-identified patent and that said Letters Patent is hereby corrected as shown below:

On the Title Page

On page 2, Column 2, under Other Publications, Line 5, delete "Adal," and insert -- Adalı, --, therefor.

On page 2, Column 2, under Other Publications, Line 5, delete "Tantu." and insert -- Tantuğ. --, therefor.

In the Specification

In Column 4, Line 17, delete "perforating" and insert -- performing --, therefor.

In Column 4, Line 40, delete "arc" and insert -- are --, therefor.

In Column 5, Line 48, delete "snore" and insert -- more --, therefor.

In Column 5, Line 65, delete "fin" and insert -- firm). --, therefor.

In Column 6, Line 35, delete "Twitter ❁ feed)." and insert -- Twitter® feed). --, therefor.

In Column 6, Line 41, delete "Jive ❁" and insert -- Jive® --, therefor.

In Column 6, Line 42, delete "Lithium ❁ ." and insert -- Lithium®. --, therefor.

In Column 6, Line 52, delete "Jive ❁ or Lithium ❁ ." and insert -- Jive® or Lithium®. --, therefor.

In Column 6, Line 55, delete "Facebook ❁, Twitter ❁, Blogger ❁," and insert -- Facebook®, Twitter®, Blogger®, --, therefor.

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,288,033 B2

In Column 6, Line 57, delete "Facebook ●" and insert -- Facebook® --, therefor.

In Column 8, Line 39, delete "modern" and insert -- modem --, therefor.

In Column 9, Line 37, delete "categorizes" and insert -- categorizer --, therefor.

In Column 9, Line 46, delete "507a," and insert -- 607a, --, therefor.

In Column 15, Line 61, delete "nay" and insert -- may --, therefor.

In Column 17, Lines 66-67, delete "A #4.A.1.," and insert -- A #4.A.1, --, therefor.

In Column 21, Line 9, delete "In" and insert -- in --, therefor.